United States Patent [19]
Sugito et al.

[11] Patent Number: 5,467,517
[45] Date of Patent: Nov. 21, 1995

[54] METHOD AND SYSTEM FOR FITTING WORK-PIECES

[75] Inventors: Katsuhiko Sugito; Yasuo Hibi, both of Nagoya, Japan

[73] Assignee: Nippondenso Co., Ltd., Japan

[21] Appl. No.: 68,671

[22] Filed: May 28, 1993

[30] Foreign Application Priority Data

May 29, 1992 [JP] Japan ................................. 4-164216
Apr. 20, 1993 [JP] Japan ................................. 5-117727

[51] Int. Cl.$^6$ ............................................. B23P 21/00
[52] U.S. Cl. ............................ 29/407; 29/450; 29/463; 29/717; 29/720; 29/787; 29/789
[58] Field of Search ................................ 29/407, 450, 463, 29/717, 720, 773, 787, 789; 364/468

[56] References Cited

U.S. PATENT DOCUMENTS

| | | | |
|---|---|---|---|
| 4,715,772 | 12/1987 | Kanayama | 29/720 X |
| 5,148,591 | 9/1992 | Pryor | 29/407 |
| 5,159,745 | 12/1992 | Kato | 29/407 |
| 5,243,755 | 9/1993 | Inaba et al. | 29/720 X |

FOREIGN PATENT DOCUMENTS

| | | | |
|---|---|---|---|
| 2-256430 | 10/1990 | Japan | 29/720 |
| 4-51600 | 2/1992 | Japan | 29/720 |
| 5-267892 | 10/1993 | Japan | 29/720 |
| 5-315798 | 11/1993 | Japan | 29/720 |

*Primary Examiner*—S. Thomas Hughes
*Attorney, Agent, or Firm*—Cushman, Darby & Cushman

[57] ABSTRACT

Upper and lower work-pieces are fitted with each other to obtain a product. The work-pieces are provided with separate pairs of lands 11, 12, 13 and 14 to be fitted with each other. A land of the least rigidity is initially selected, and a fitting operation is carried out for the first land at a portion of an assembling allowance. Then, a self-guided fitting of the remaining portion of the first land is carried out. Then, a provisional fitting condition is created by disengaging the first land except at the least rigid portion. Then, the correction of the deviation in the second land is done by obtaining a relative displacement between the upper and lower work-pieces while the engagement of the first land is maintained. Then, the fitting of the second land is carried out.

15 Claims, 27 Drawing Sheets

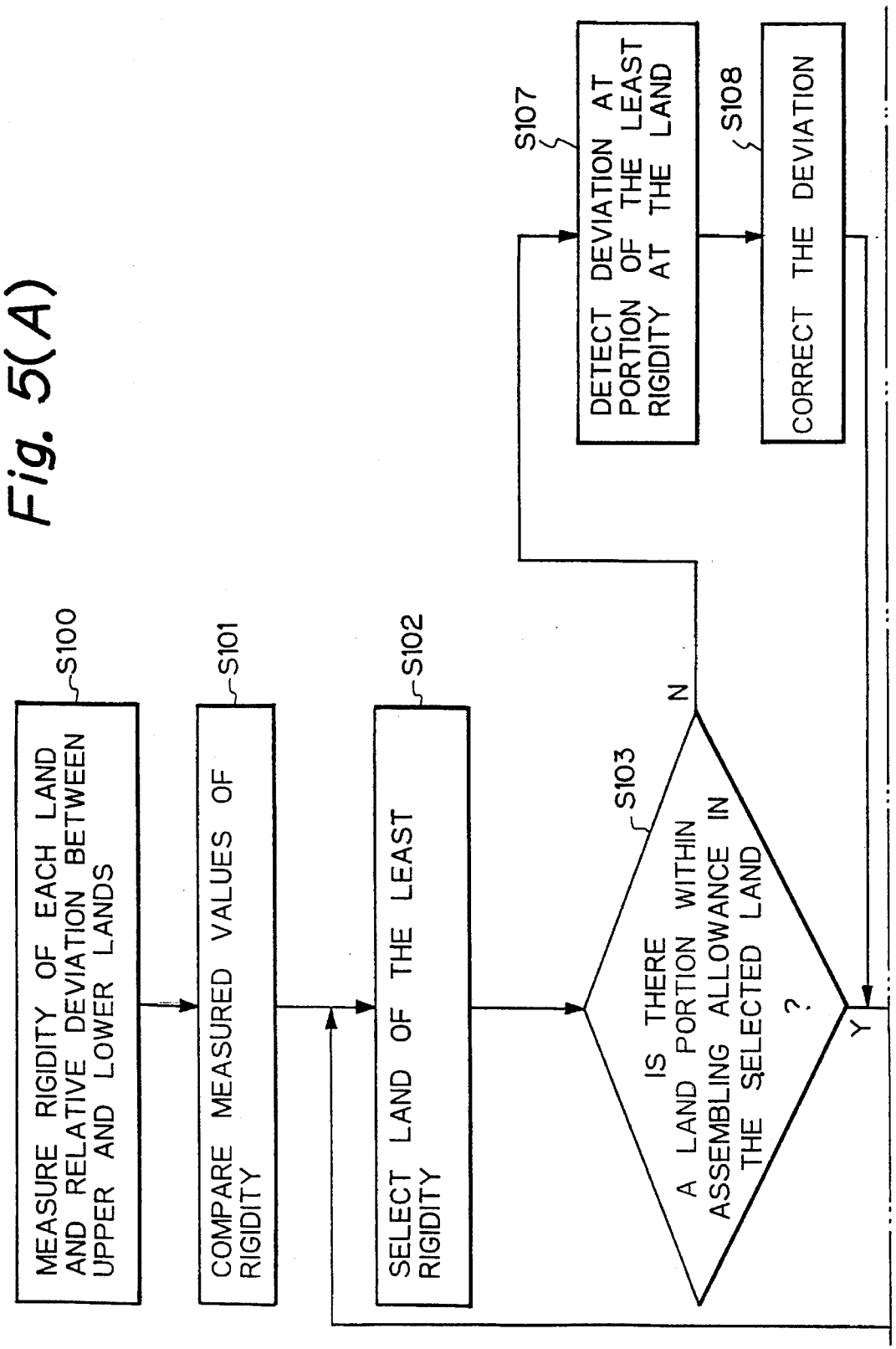

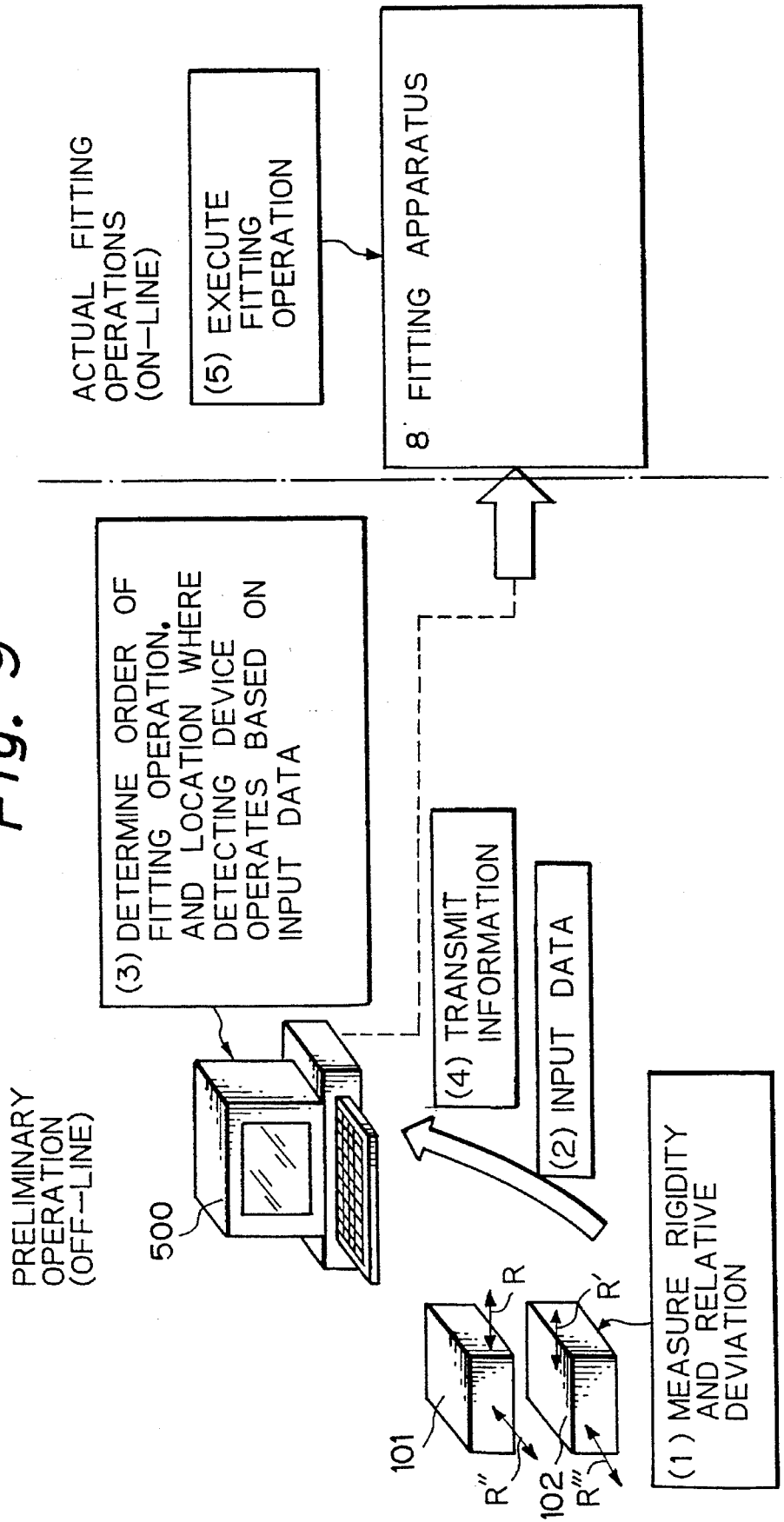

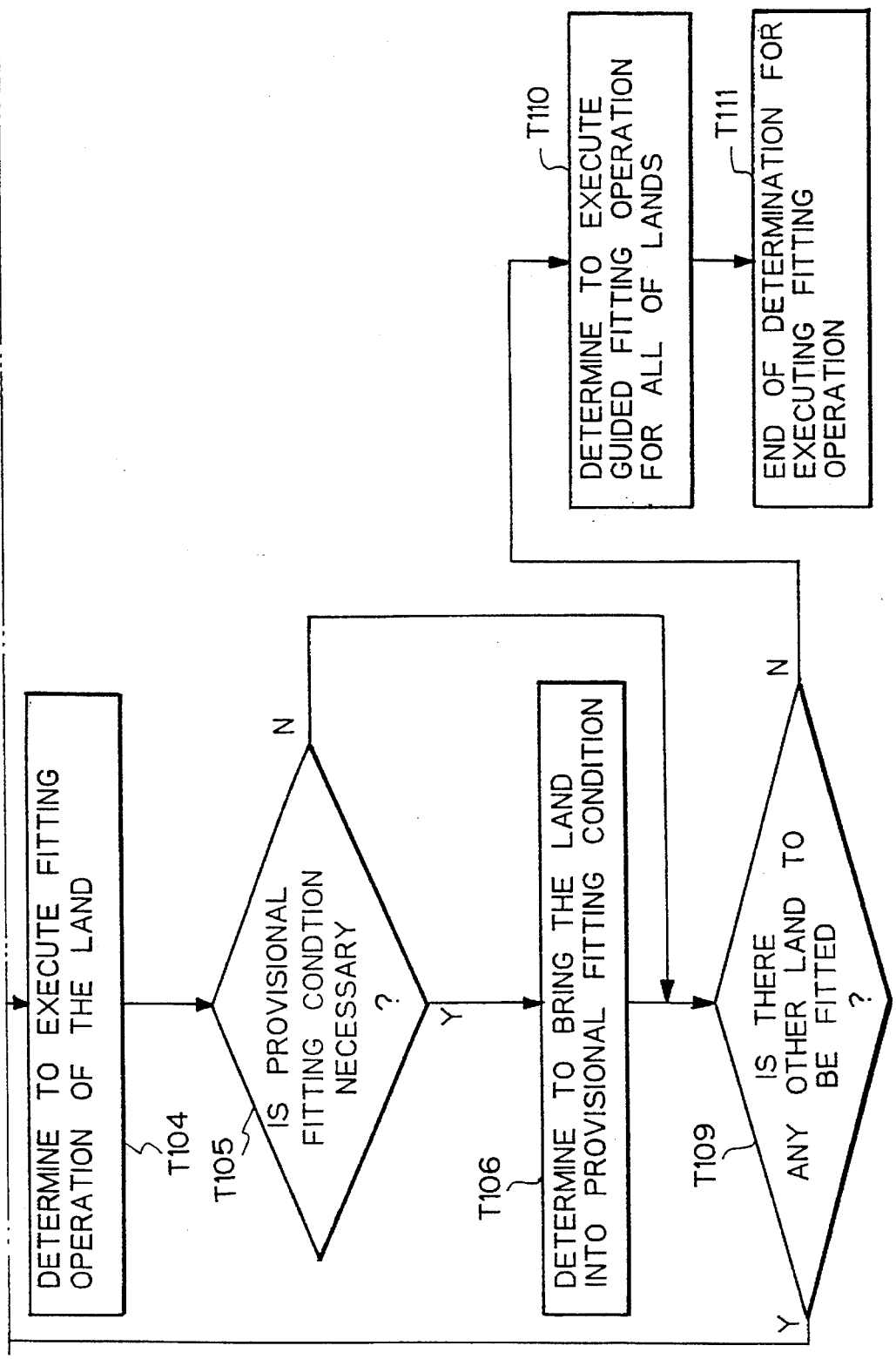

Fig. 35(A)
Fig. 35(B)
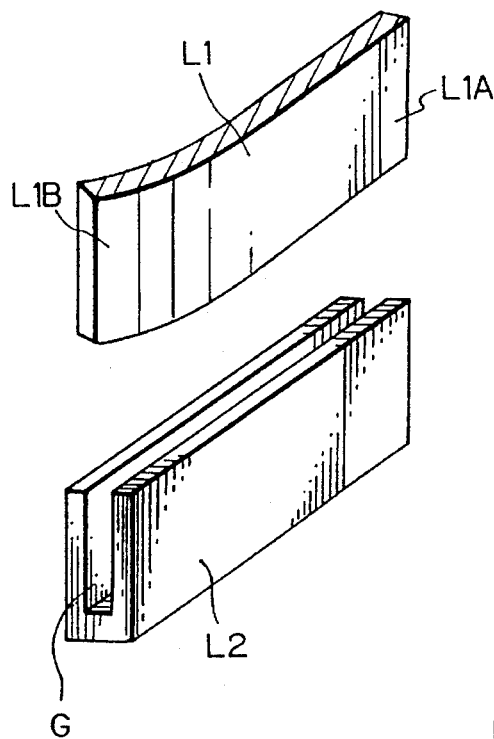
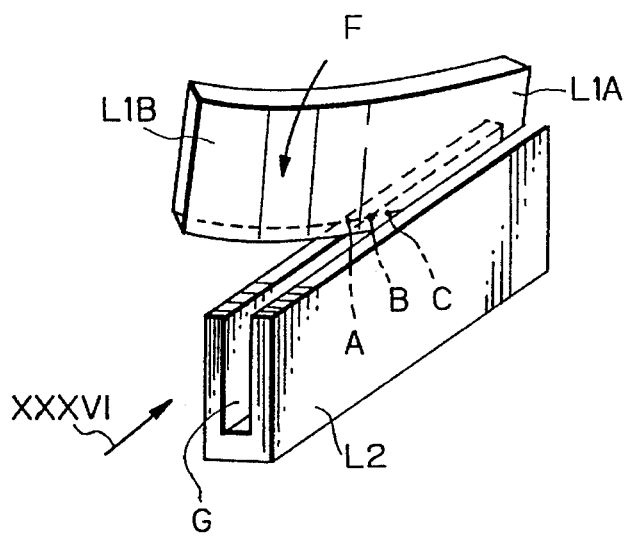
Fig. 36(A)
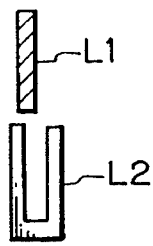
LOCATION A
Fig. 36(B)
LOCATION B
Fig. 36(C)
LOCATION C

METHOD AND SYSTEM FOR FITTING WORK-PIECES

BACKGROUND OF THE INVENTION

1. Field of the Invention

The present invention relates to a method and system for fitting work-pieces of complicated shapes.

Definition:

The term work-pieces means parts to be fitted with each other for constructing various products, such as a heater unit, cooler unit, and a booster (blower) unit for an air conditioning device for an automobile, a hand scanner, a personal computer, cases for storing various products, such as dolls and toys, cases for storing clothes and shoes, and cases for storing foods or miscellaneous goods, parts for furniture, intermediate parts, parts for constructing a building, and parts for an enclosure, and so on. The work-piece may be advantageously made as a molded product from a resilient or flexible material such as a plastic or as a shaped product from a thin web material such as tinplate and zinc sheet, or as a shaped product from a thick paper plate, such as a corrugated cardboard. These work-pieces may have various shapes such as a cube, a rectangular parallelepiped, a polygonal pillar shape, or a cylindrical body with or without interrupted portions.

The term "fitting land" indicates a separated section in a work-piece which is separated from the remaining section (s) thereof and which is subjected to a separate fitting operation with a corresponding section in an opposite work-piece.

The term "fitting portion" indicates a location in a fitting land which is fitted to a paired fitting portion in a fitting land in an opposite work-piece. Such a pair of fitting lands includes a combination of projection and a groove (FIG. 13), a combination of a pin and a hole (FIG. 30), or a combination of recessed surfaces (FIG. 33).

The term "low rigidity portion" indicates a portion among the portions in a fitting land, which provides a relatively lower value of the rigidity, i.e., of higher value of elasticity. As will be apparent from the disclosure hereinbelow, rigidity as used herein relates to stiffness or stiffness co-efficient which is the ratio of the force acting on a land to the displacement of the land.

The term "provisional fitting state" indicates a state where a fitting land in a work-piece is partially engaged with a portion in the opposite fitting work-piece, so that relative movement between work-pieces is easily allowed by an elasticity thereof, while the partially fitted condition is maintained.

The term "relative deviation" indicates the distance of a portion of a fitting land from a corresponding portion of the opposite fitting land, these fitting lands being fitted with each other.

The term "assembling allowance" means that a relative deviation between fitting lands is within a range which allows these fitting lands to be engaged with each other due to a guiding operation.

The term "self-guided fitting" is a fitting operation of a pair of fitting lands in work-pieces caused by a relative rotation of the work-pieces, which fitting operation is commenced from a location of the lands as being fitted, as an origin, and which is gradually proceeded under a self guiding action of the fitting lands, as they are being fitted.

2. Description of a Related Art

A product such as an air conditioning device for an automobile is basically constructed from separated parts which are fitted with each other. In this kind of product, a plurality of fitting lands is provided, which makes it difficult for the fitting operation to be easily and reliably executed. Namely, in order to obtain a desired fitting operation, a desired relationship should be maintained between the separated parts in every fitting land. In the prior art, a plurality of supporting members are provided for obtaining a desired relationship between the separated parts in every fitting lands. However, this requires a use of a large number of supporting members, causing the device to be complicated and the fitting process to be troublesome.

SUMMARY OF THE INVENTION

An object of the present invention is, therefore, to provide a method and apparatus for obtaining a fitting operation for a work-piece of a complicated structure, while the fitting process is easy and the construction is relatively simple and of a low cost.

According to the present invention, a method is provided for fitting work-pieces separated from each other and having a plurality of pairs of fitting lands, comprising the steps of:

(a) providing holding means for stationary holding one of the work-pieces;

(b) providing fitting means for movably holding the other work-piece, said fitting means being capable of moving the other work-piece toward said one work-piece;

(c) determining a consecutive order of the fitting operations between the plurality of pairs of fitting lands;

(d) determining if the pair of fitting land subjected to the first stage fitting operation has a fitting portion which is within a range of assembling allowance;

(e) upon a determination that the selected pair of the fitting land is out of the range of assembling allowance at the step (d), correcting a relative deviation in the initially selected land by moving the other work-piece by said fitting means so that the selected pair of the fitting land is within the range of the assembling allowance;

(f) with regard to the initially selected fitting land within the range of assembling allowance, executing a fitting operation by moving the other work-piece by said fitting means so that the initially selected pair of the fitting lands are fitted with each other;

(g) with regard to the fitting lands to be fitted in the secondary order, determining if the pair of fitting land subjected to the secondary stage fitting operation has a fitting portion which is within a range of assembling allowance;

(h) upon a determination that the selected pair of the fitting land in the secondary order fitting operation is out of the range of assembling allowance at the step (g), correcting a relative deviation in the secondary selected land by moving the other work-piece by said fitting means so that the secondary selected pair of the fitting land is within the range of the assembling allowance, while maintaining the fitting condition of the initially selected fitting land, and;

(i) with regard to the secondary selected fitting land within the range of assembling allowance, executing a fitting operation by moving the other work-piece by said fitting means so that the secondary selected pair of the fitting lands are fitted with each other.

According to another aspect of the present invention, a method is provided for fitting work-pieces separated with each other and having a plurality of pairs of fitting lands, comprising the steps of:

(a) comparing between the fitting lands by their least values of the rigidity to select the first fitting land providing the lower value of the least rigidity from the remaining fitting land of a higher value of the least rigidity;

(b) executing a fitting operation of the first fitting land to obtain a provisional fitting condition where only a portion of the first fitting land of a smaller value of the rigidity is engaged, while remaining portions are at least partially disengaged;

(c) executing a fitting operation the second fitting land to obtain a provisional fitting condition where only a portion of the second fitting land of a smaller value of the rigidity is engaged, while the remaining portions are at least partially disengaged, while the provisional fitting condition at the first land being maintained, and;

(d) executing complete fitting operation of all of the fitting lands by a self-guided fitting operation where the said fitting portions of the first and second fitting land serve as initial points.

This method for fitting can be applied when a fitting operation is executed for the same kind products of a number, for example, between 10 to 1,000. Namely, for the fitting operation for the same kind of work-pieces, the position of the fitting lands, the rigidity at each portion of each fitting land, and the value of the deviation are substantially same. Thus, before commencement of the fitting operation, these values can be stored in a memory of the computer, and the sequence for the fitting operation can be determined under so called off-line manner. Thus, the fitting operation can be executed under the sequence determined under the off-line manner, which allows the fitting operation to be executed very effectively for a large number of the work-pieces.

According to a further another aspect of the present invention, a system is provided for fitting work-pieces separated from each other and having a plurality of pairs of fitting lands, comprising:

means for holding at least one of the work-pieces and for obtaining a relative movement of the work-pieces for obtaining a fitting operation of the fitting lands, while a relative deviation in the fitting lands is corrected;

means for providing a signal indicative of the relative deviation between fitting portions in the fitting land, and;

means, responsive to the signal from the detecting means for operating the work fitting means.

According to a still another aspect of the present invention, a system is provided for fitting work-pieces separated from each other and having a plurality of pairs of fitting lands, comprising:

means for holding at least one of the work-pieces and for obtaining a relative movement of the work-pieces for obtaining a fitting operation of the fitting lands;

means determining the order of the fitting operation between the fitting lands;

means for determining, for the initially selected land, if a fitting portion exists within an assembling allowance;

means for obtaining a relative movement between the work-pieces by the work-piece holding means so that the fitting land is within the assembling allowance, and;

means for executing operation when the fitting land is within an assembling allowance.

According to the present invention, a higher order of the fitting operation is obtained, when the rigidity of the work or the error in the relative position is small. As a result, a reliable and positive fitting can be executed even in the case where the work-piece subjected to the fitting operation has a complicated structure, due to the fact that the elasticity in the work-piece is effectively used, which allows a self-guided fitting effect to be occurred, which allows the fitting to be effectively executed irrespective of an existence in the relative deviation of position between the portions of the work-pieces to be fitted.

According to the present invention, the elasticity of the work is used to cancel the relative deviation, so that a fitting of work-piece of a complicated shape is eased, without worsening the productivity.

Finally, the present invention is suitable of obtaining an automation of the fitting operation, without requiring unreasonably increased cost.

BRIEF DESCRIPTION OF THE ATTACHED DRAWINGS

Figure 5B:
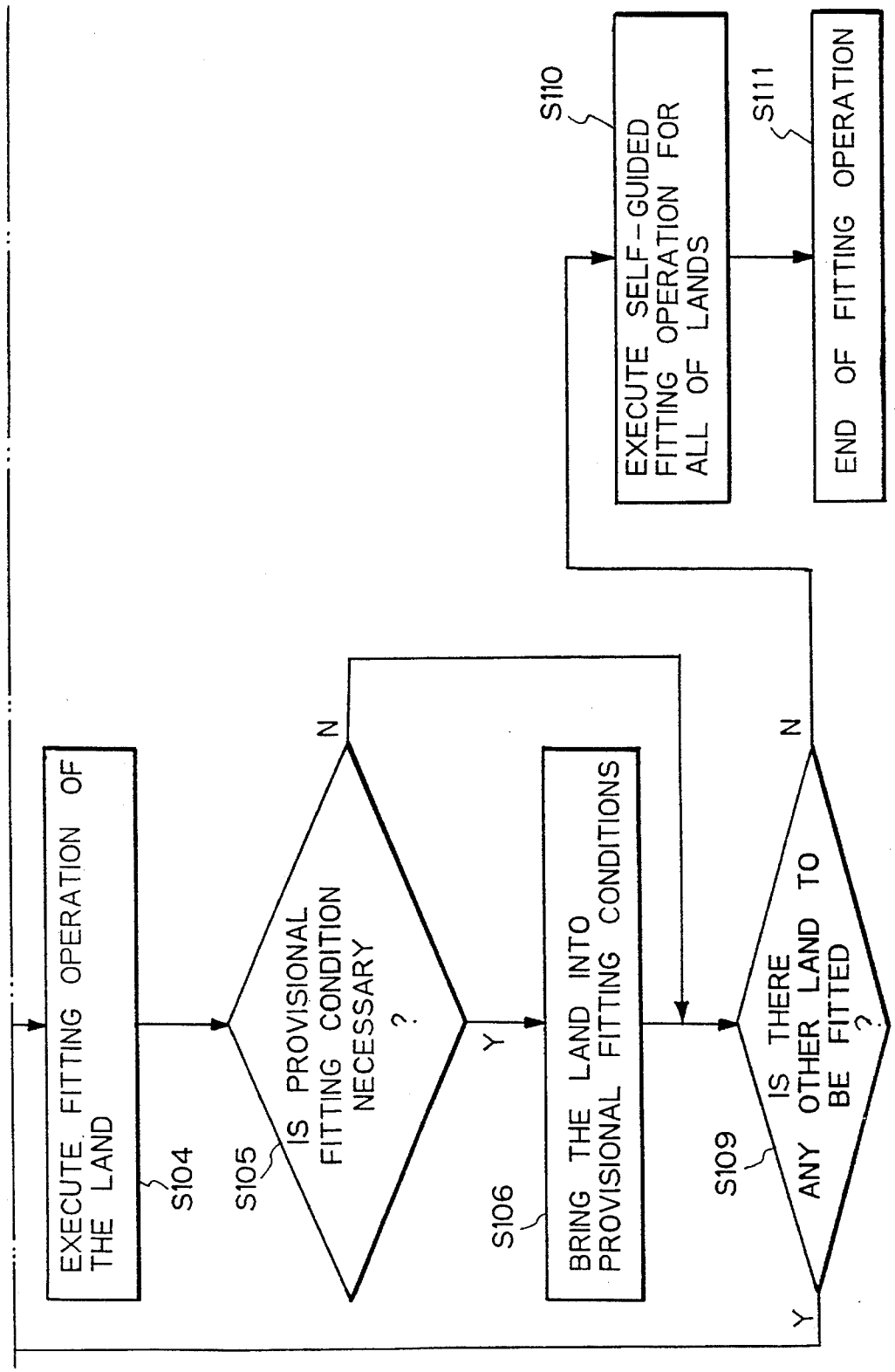

FIGS. 5(A) and 5(B) together constitute a flowchart generally illustrating the fitting operation according to the present invention.

Figure 6:
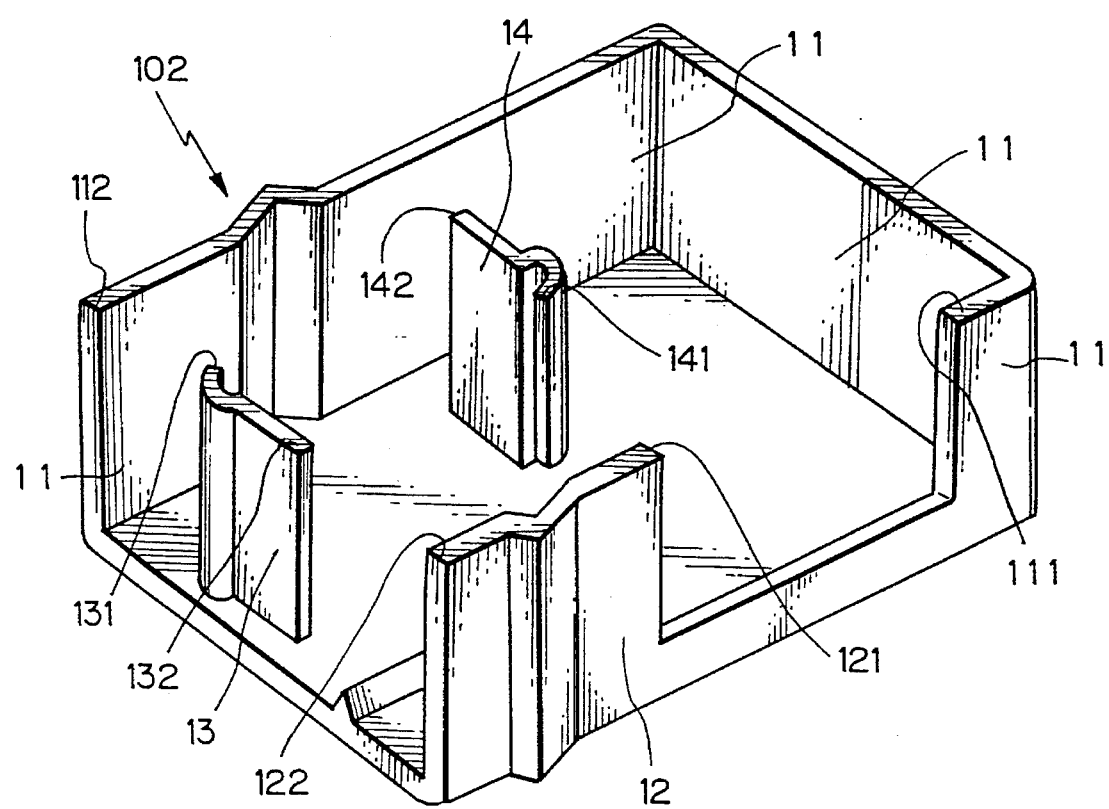

FIG. 6 is a perspective view of a work-piece (lower case).

Figure 7A:
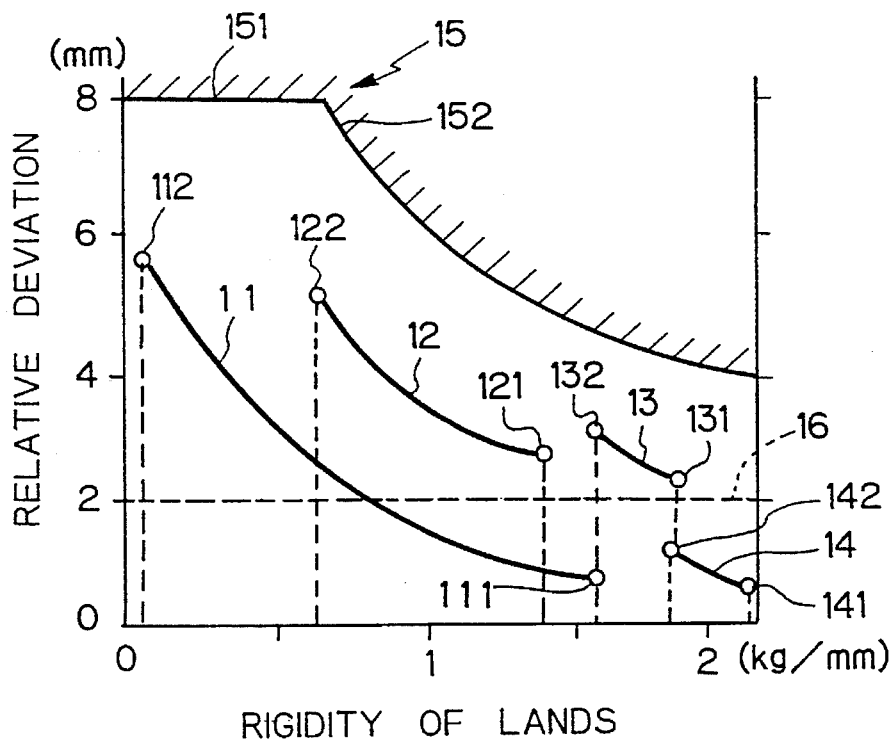
Figure 7B:
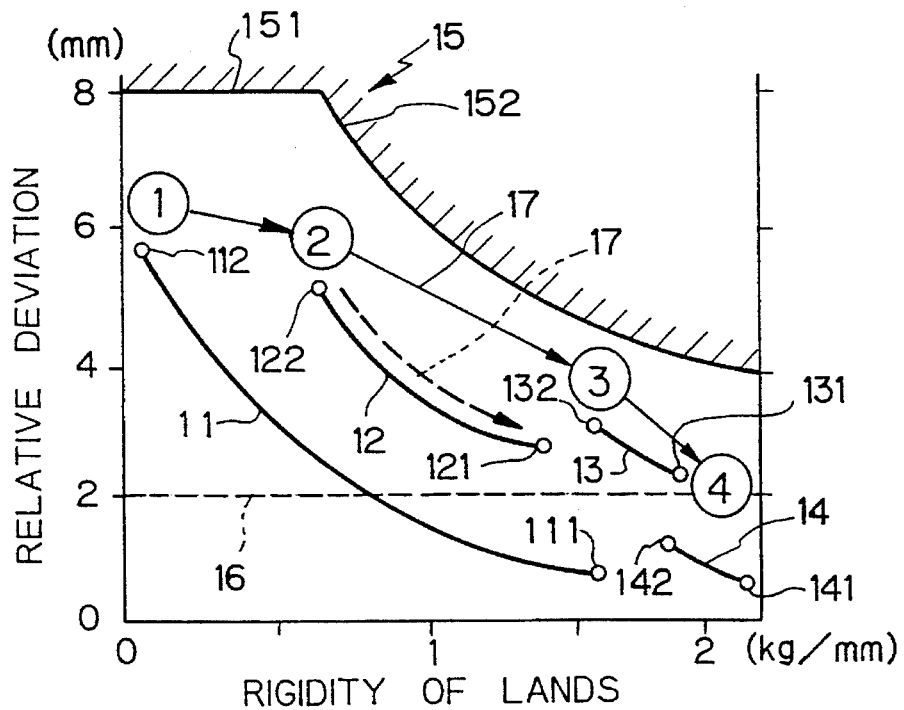
Figure 8A:
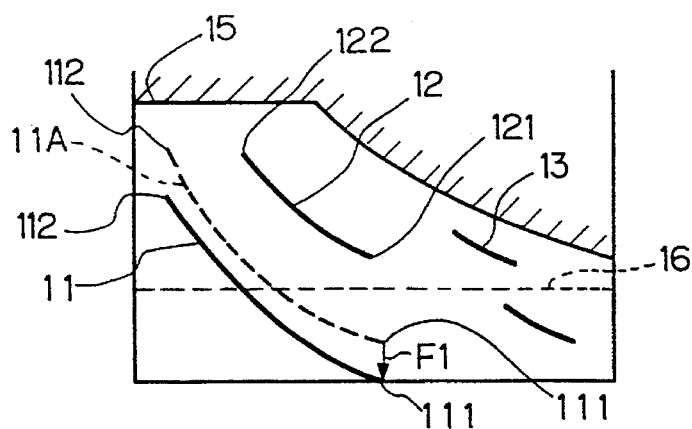
Figure 8B:
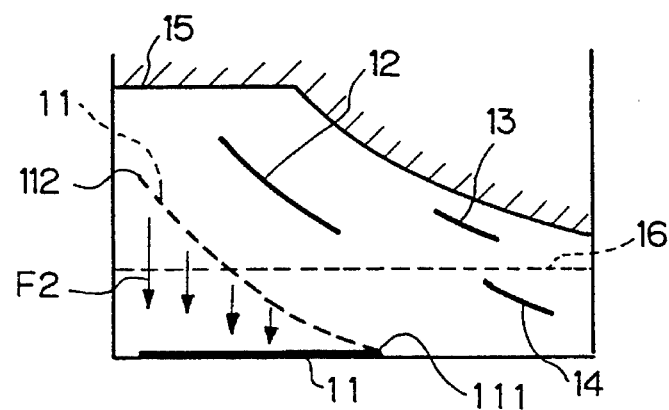
Figure 8C:
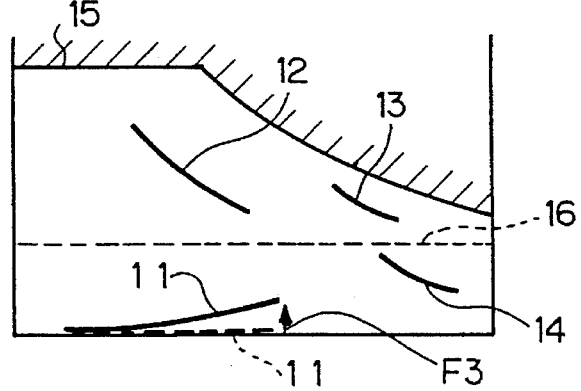
Figure 8D:
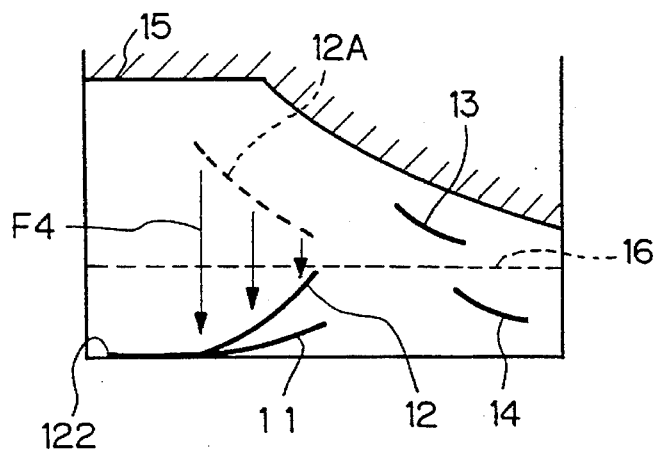
Figure 8E:
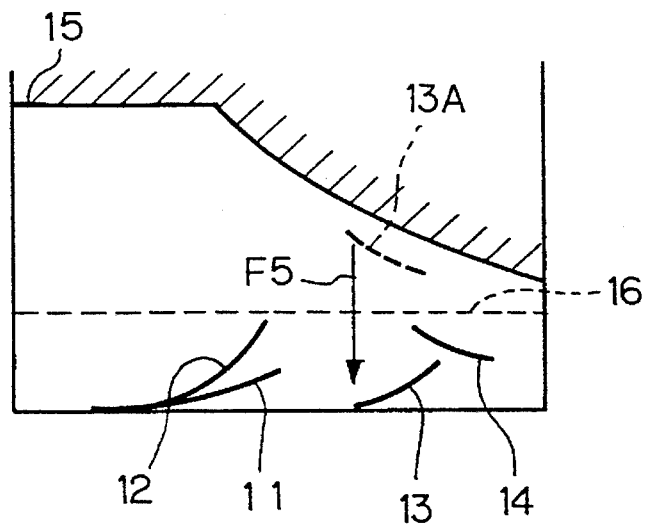
Figure 8F:
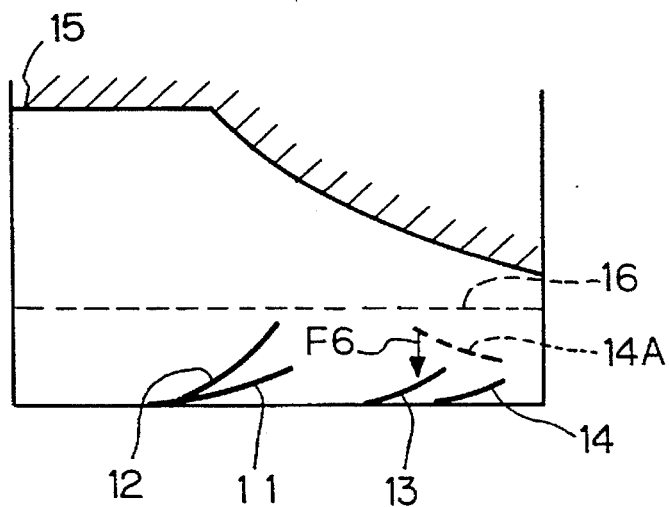
Figure 8G:
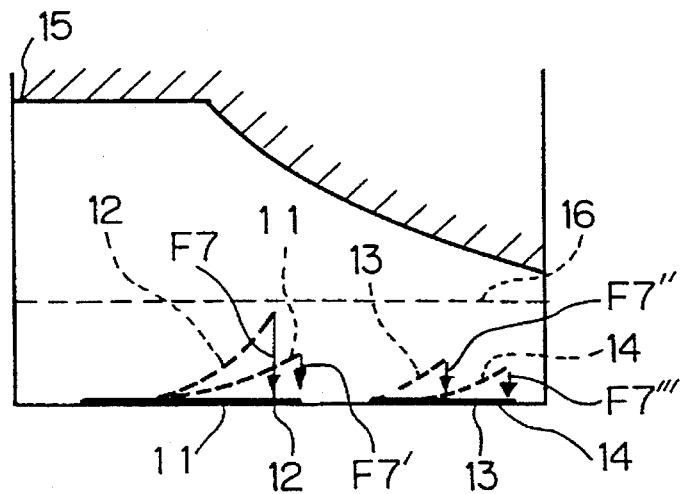

FIG. 7-(A) shows, for every fitting land in a work-piece, relationship between a rigidity and a relative deviation.

FIG. 7-(B) is similar to FIG. 7-(A), but shows a sequential order of the fitting operation between the fitting lands.

FIGS. 8-(A) to 8-(G) respectively show, in consecutive order in the fitting process, for every fitting lands, how relationships between a rigidity and relative deviation are changed.

FIG. 9 shows generally how the fitting operation in a second embodiment is executed.

Figure 10A:
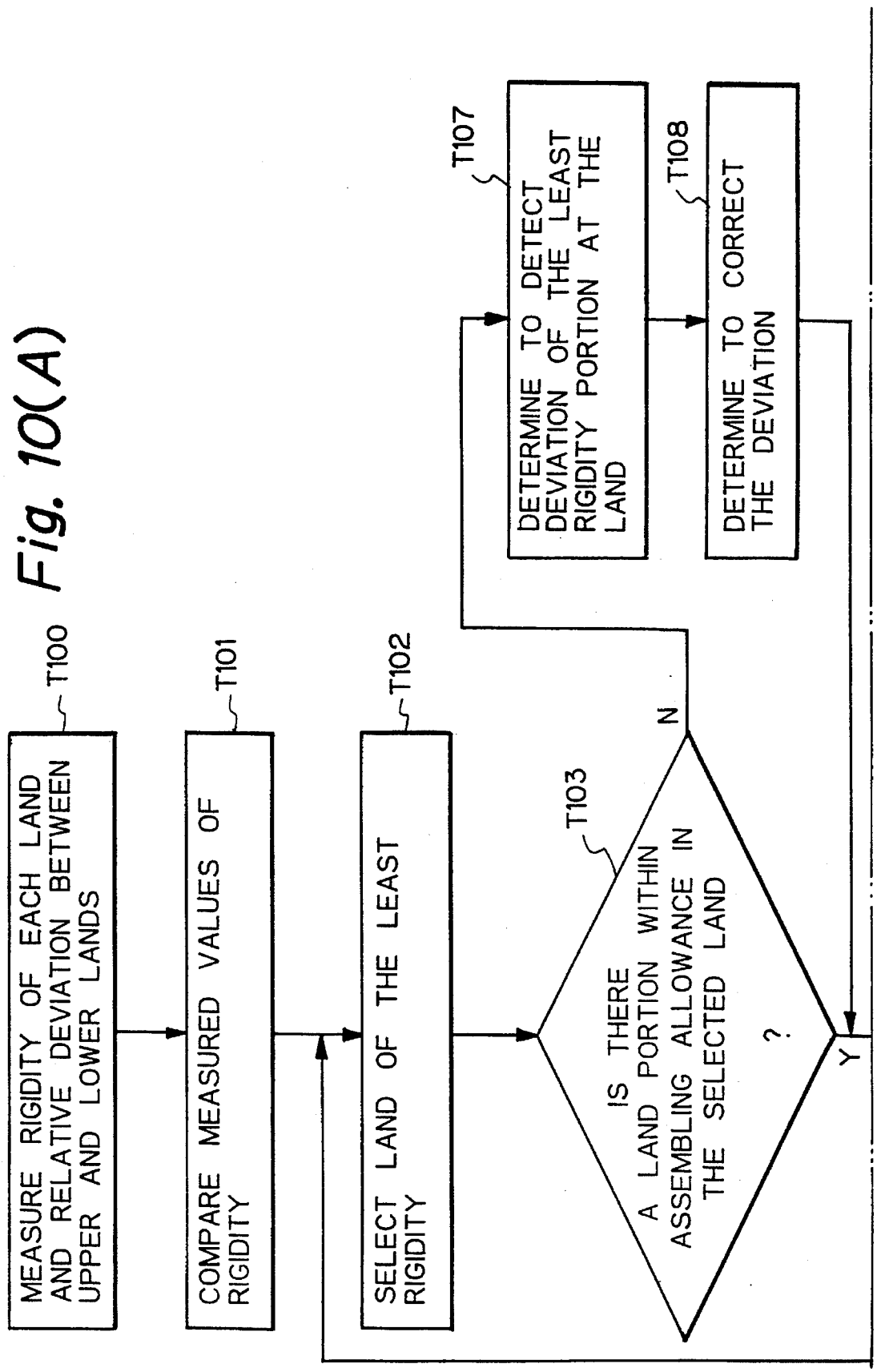

FIGS. 10(A) and 10(B) together constitute is a flow chart generally illustrating an off-line process done prior to the fitting operation in the second embodiment.

Figure 11:
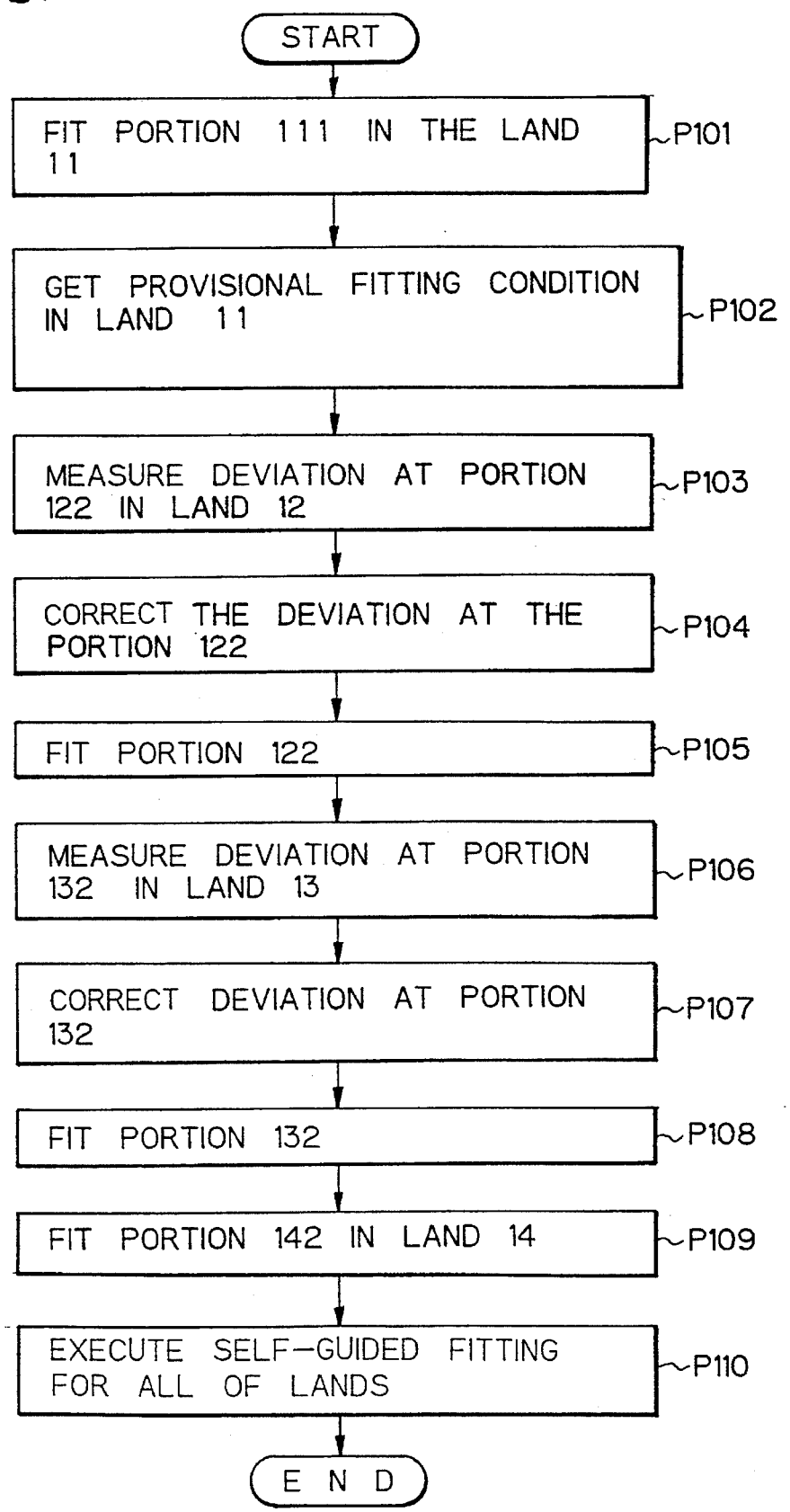

FIG. 11 is a flow chart generally illustrating an on-line process for executing a fitting operation.

Figure 12:
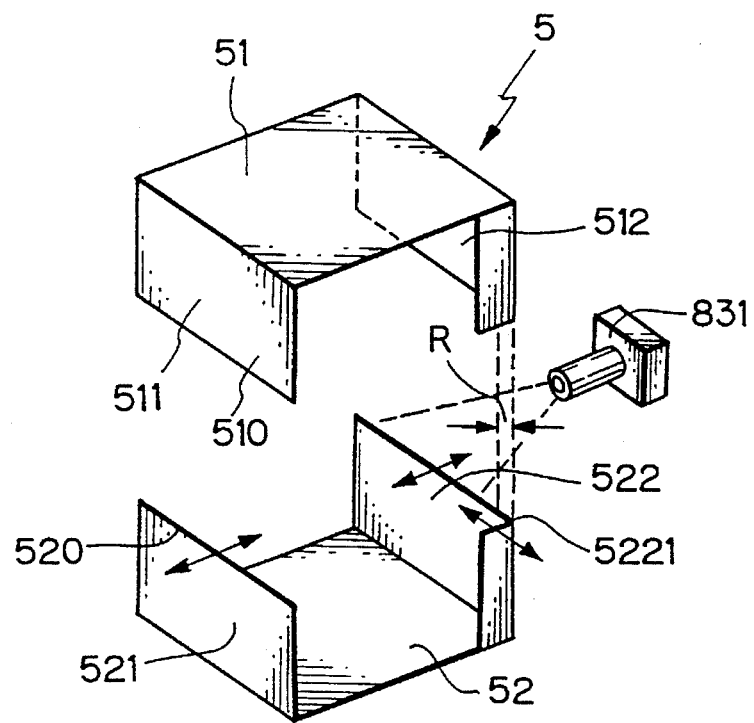

FIG. 12 is a schematic perspective view illustrating work-pieces prior to a fitting operation.

Figure 13:
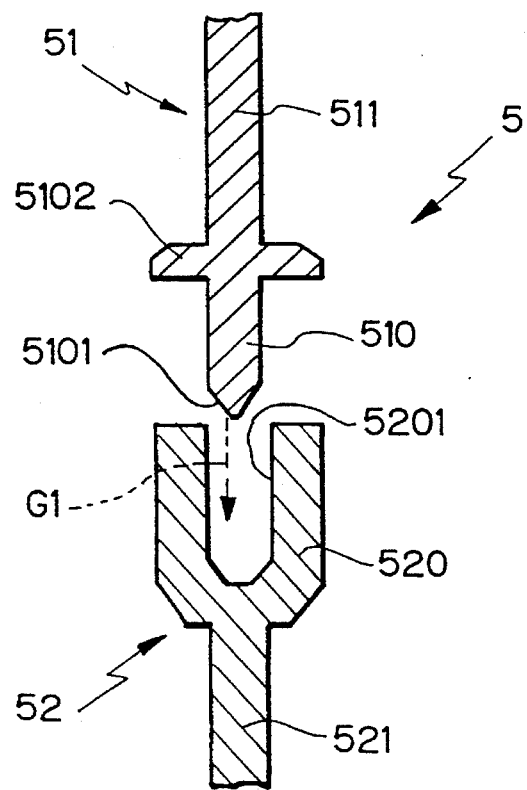

FIG. 13 is a cross sectional view illustrating a relationship between opposite fitting lands to be fitted.

Figure 14:
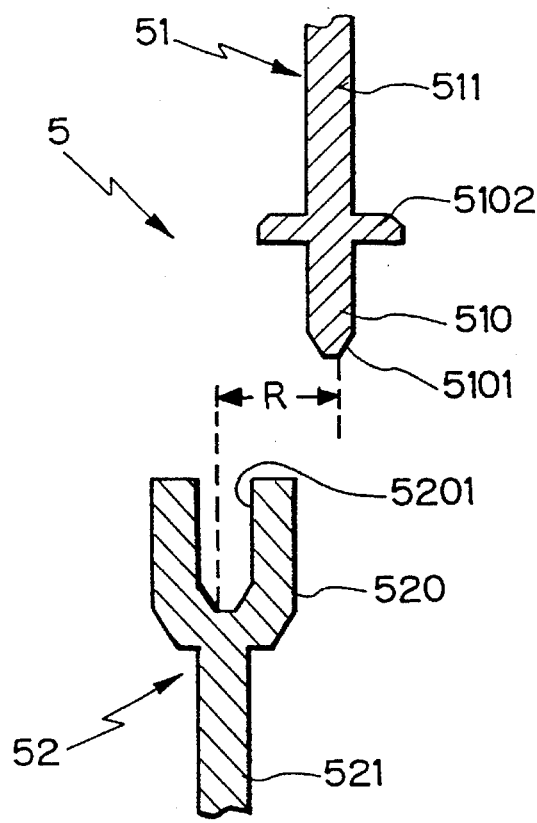

FIG. 14 is similar to FIG. 13, but illustrates a deviation existing between the opposite fitting lands.

Figure 15:
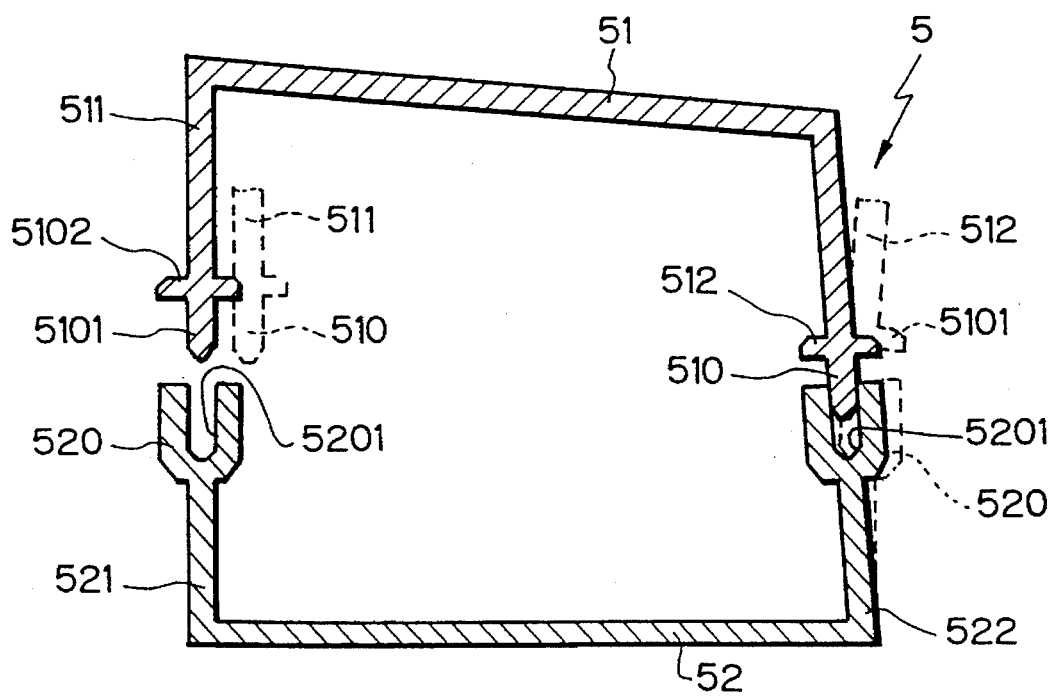

FIG. 15 illustrates how the fitting operation is done while the deviation of the fitting lands are corrected.

Figure 16:
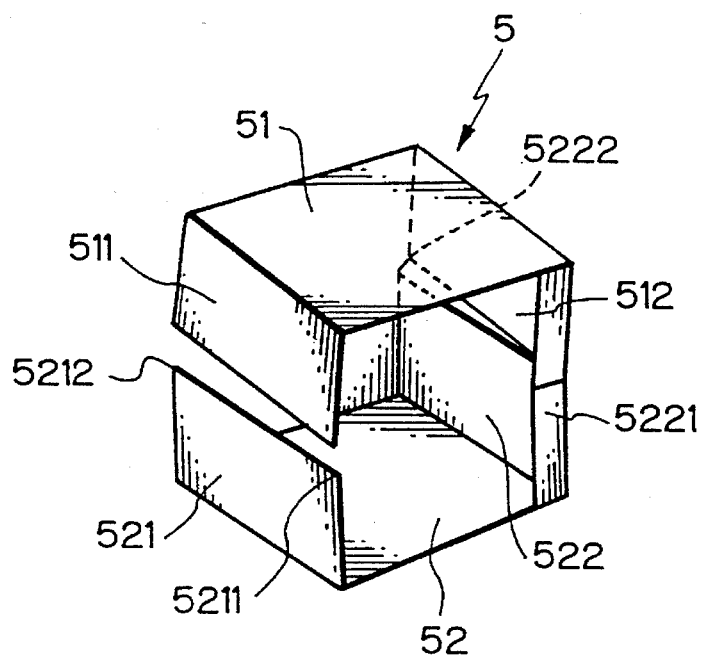

FIG. 16 is similar to FIG. 12 but illustrates a condition when a portion of the fitting land is engaged.

Figure 17:
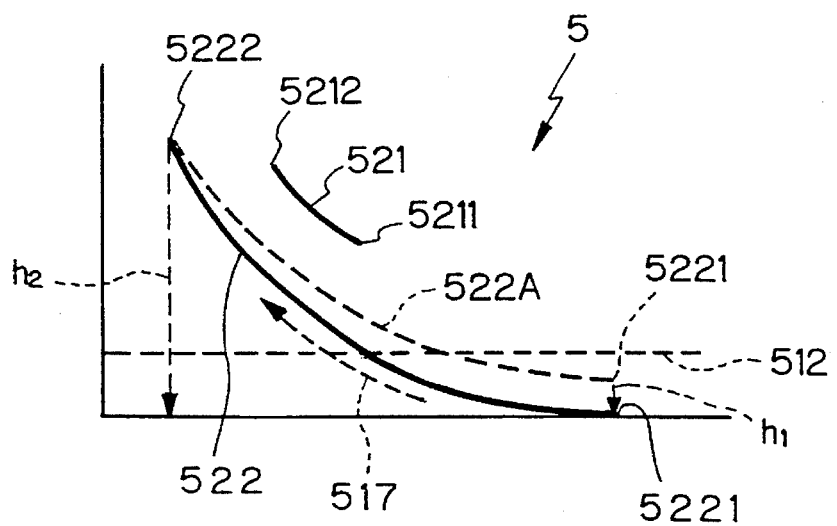

FIG. 17 shows relationships between rigidity and a relative deviation for every land under the condition of the work-pieces shown in FIG. 16.

Figure 18:
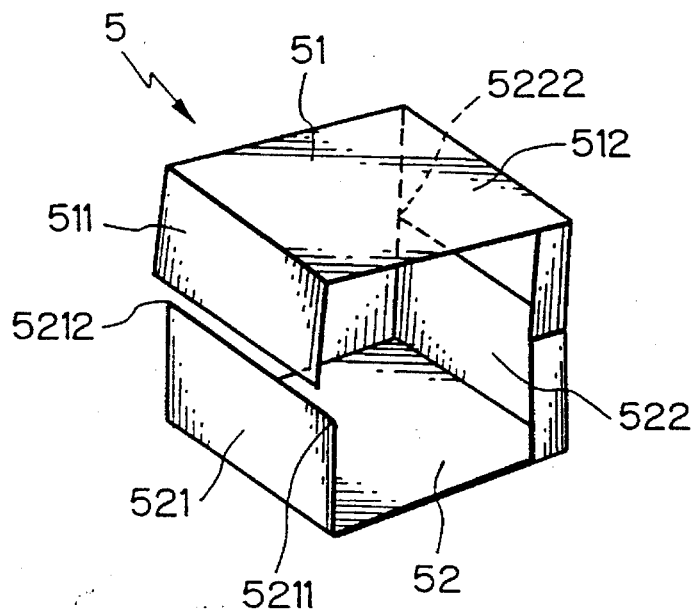

FIG. 18 is similar to FIG. 16 but illustrates a condition where a self-guided fitting is completed for the fitting land.

Figure 19:
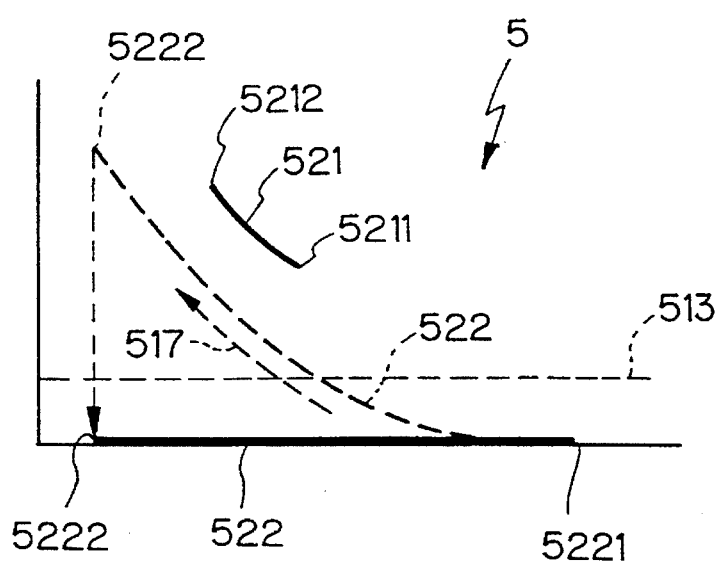

FIG. 19 shows relationships between a rigidity and a relative deviation for every land under the condition of the work-pieces shown in FIG. 18.

Figure 20:
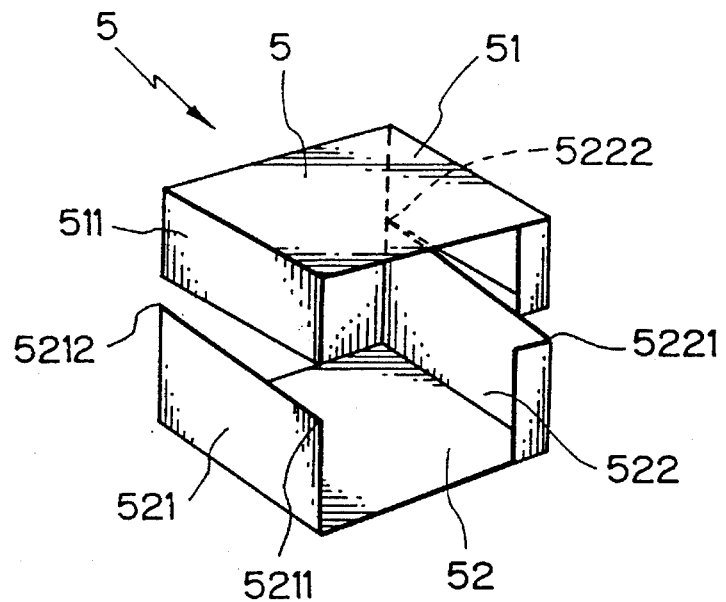

FIG. 20 is similar to FIG. 16 but illustrates a provisional fitting condition of the fitting land.

Figure 21:
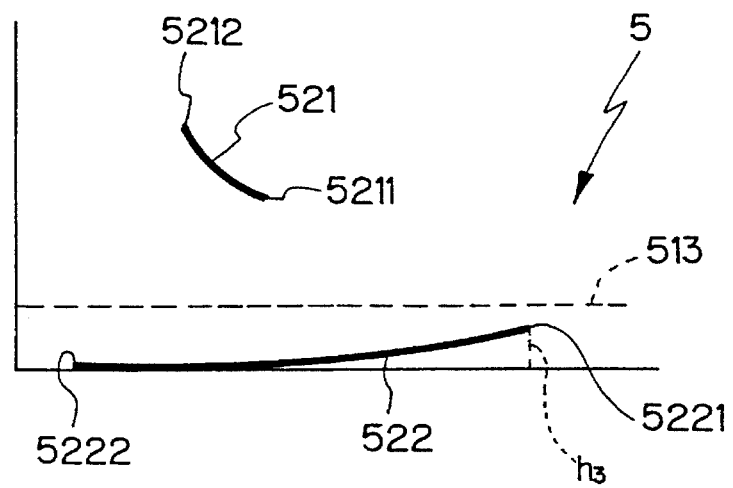

FIG. 21 shows relationships between rigidity and a relative deviation for every lands under the condition of the work-pieces shown in FIG. 20.

Figure 22:
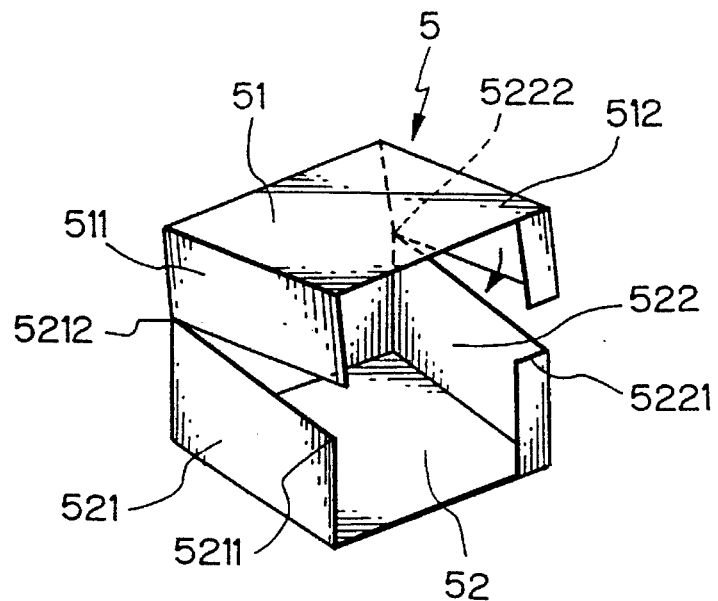

FIG. 22 is similar to FIG. 16 but illustrates that a portion of a second land is fitted.

Figure 23:
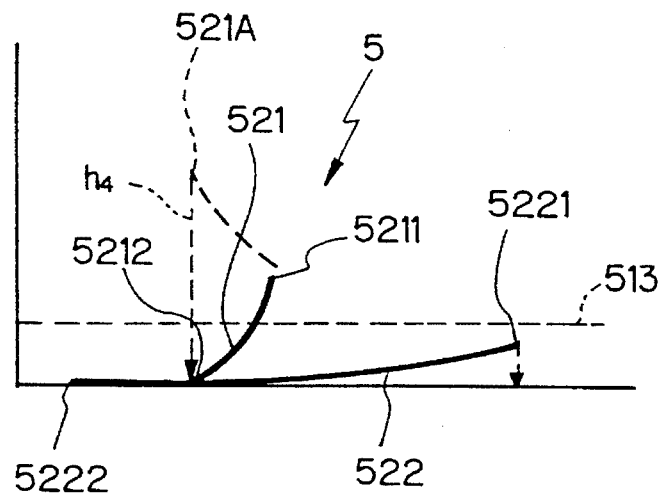

FIG. 23 shows relationships between rigidity and a relative deviation for every land under the condition of the work-pieces shown in FIG. 22.

Figure 24:
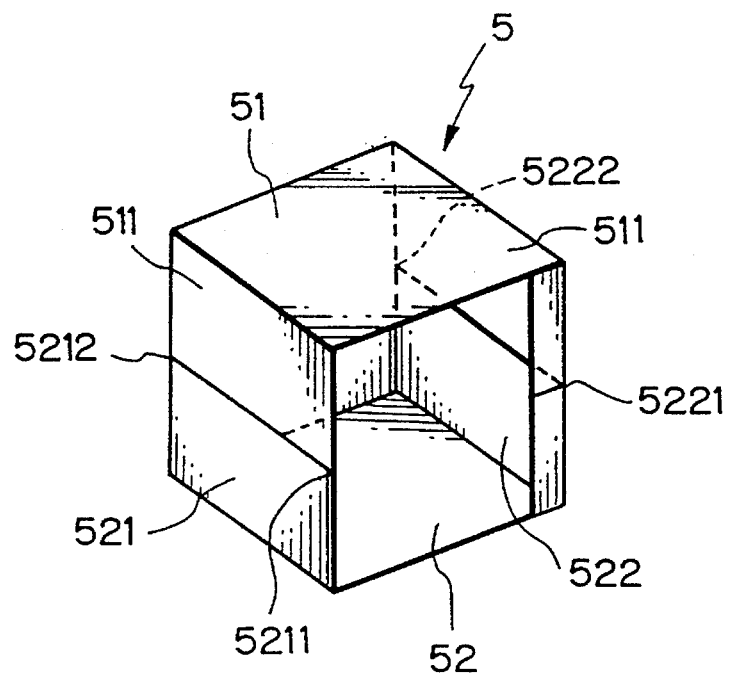

FIG. 24 is similar to FIG. 16 but illustrates that a fitting operation of work-pieces is finished.

Figure 25:
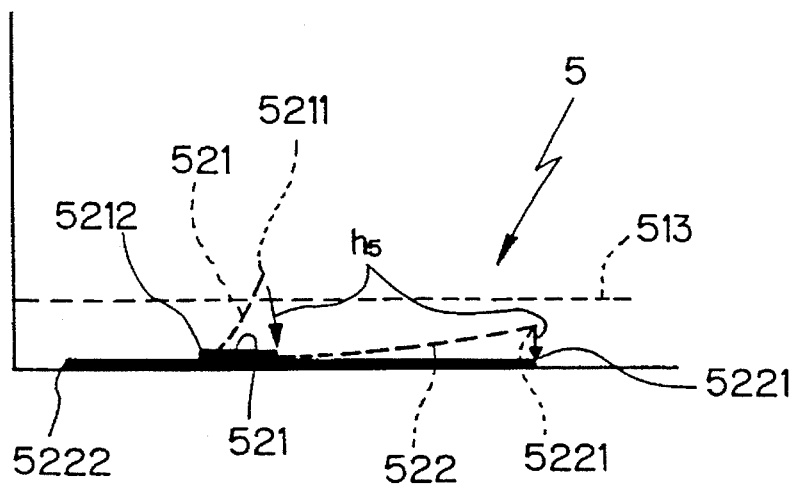
Figure 26A:
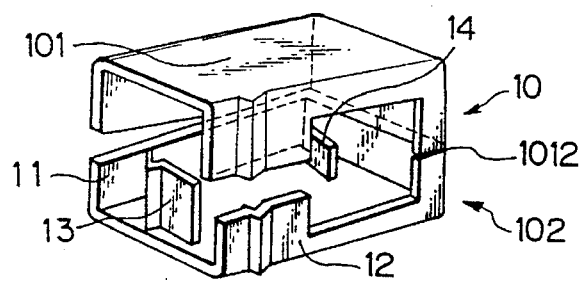
Figure 26B:
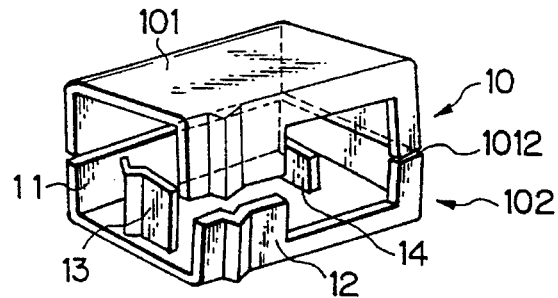
Figure 26C:
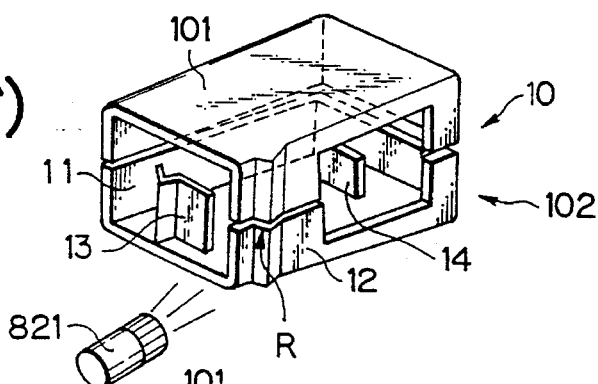
Figure 26D:
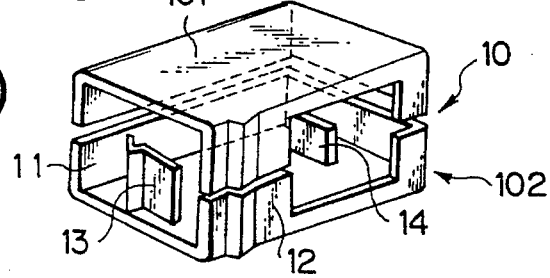
Figure 26E:
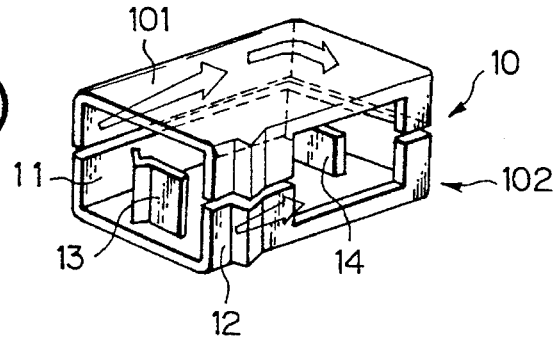
Figure 27A:
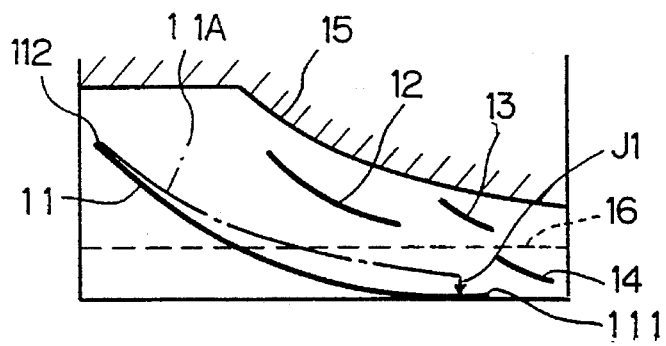
Figure 27B:
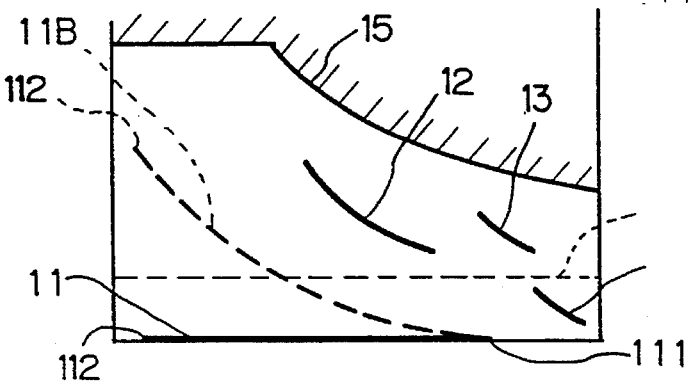
Figure 27C:
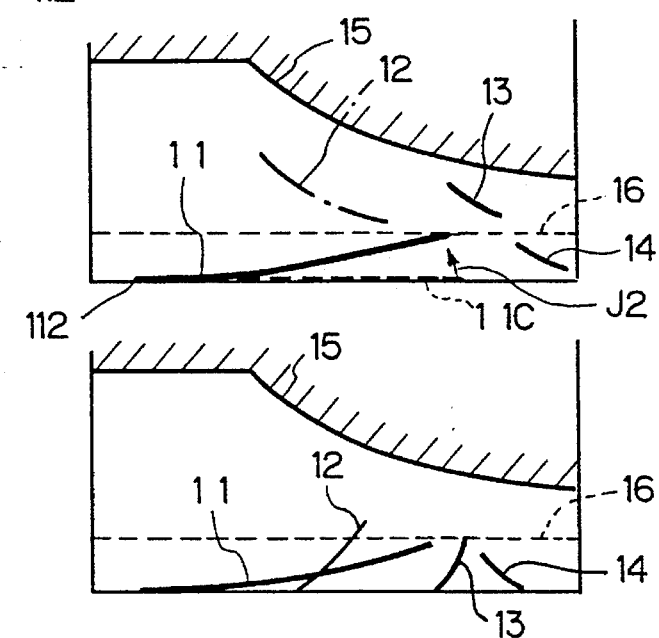
Figure 27D:
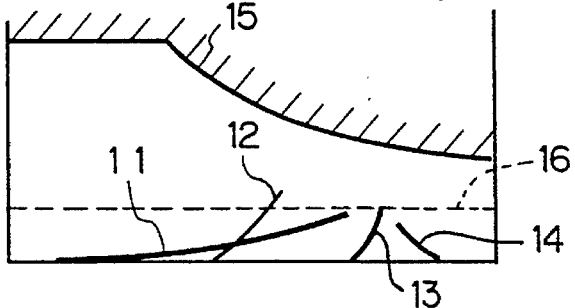
Figure 27E:
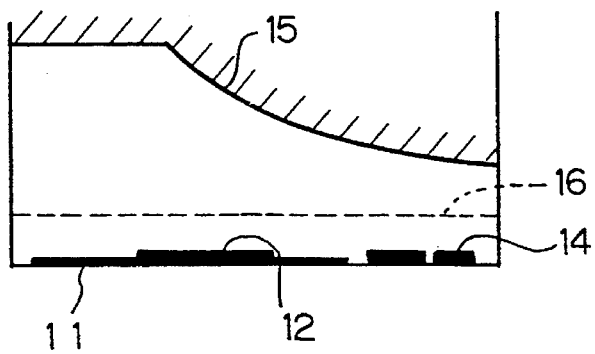

FIG. 25 shows relationships between a rigidity and a relative deviation for every lands under the condition of the work-pieces shown in FIG. 24.

FIGS. 26-(A) to (E) are schematic perspective views which show, in consecutive order, the fitting process.

FIGS. 27-(A) to (E) corresponds to FIGS. 26-(A) to (E) but show relationships between rigidity and deviations for every fitting land in the work-pieces.

Figure 28:
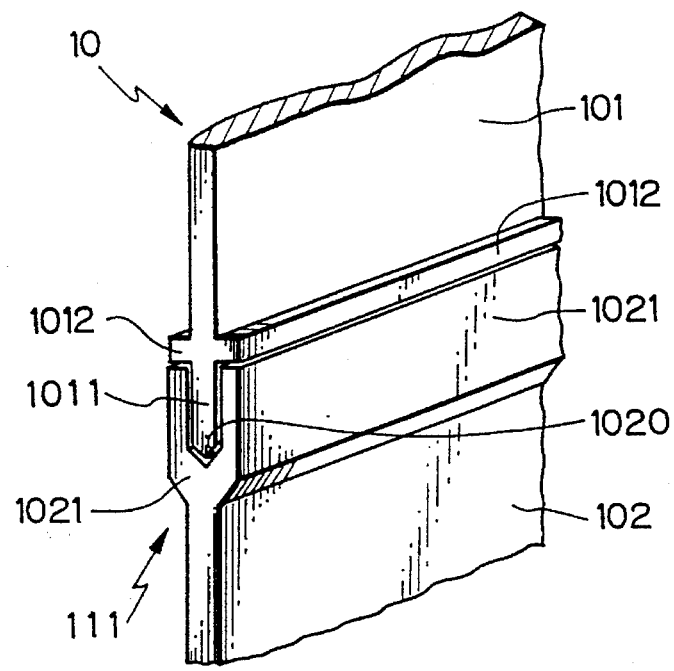

FIG. 28 shows a partial, perspective view illustrating a condition where a pair of fitting lands is fitted with each other.

Figure 29:
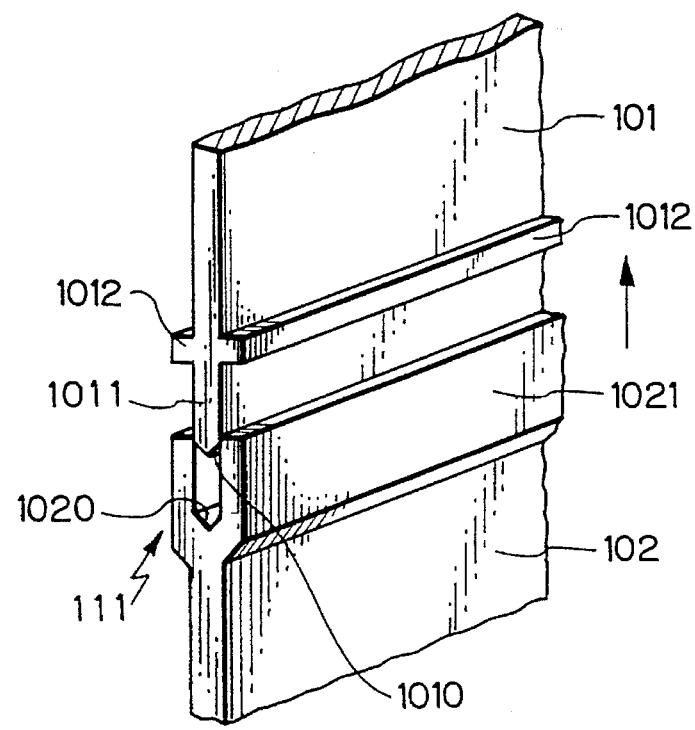

FIG. 29 is the same as FIG. 28, but shows a condition where the engagement is partially released.

Figure 30:
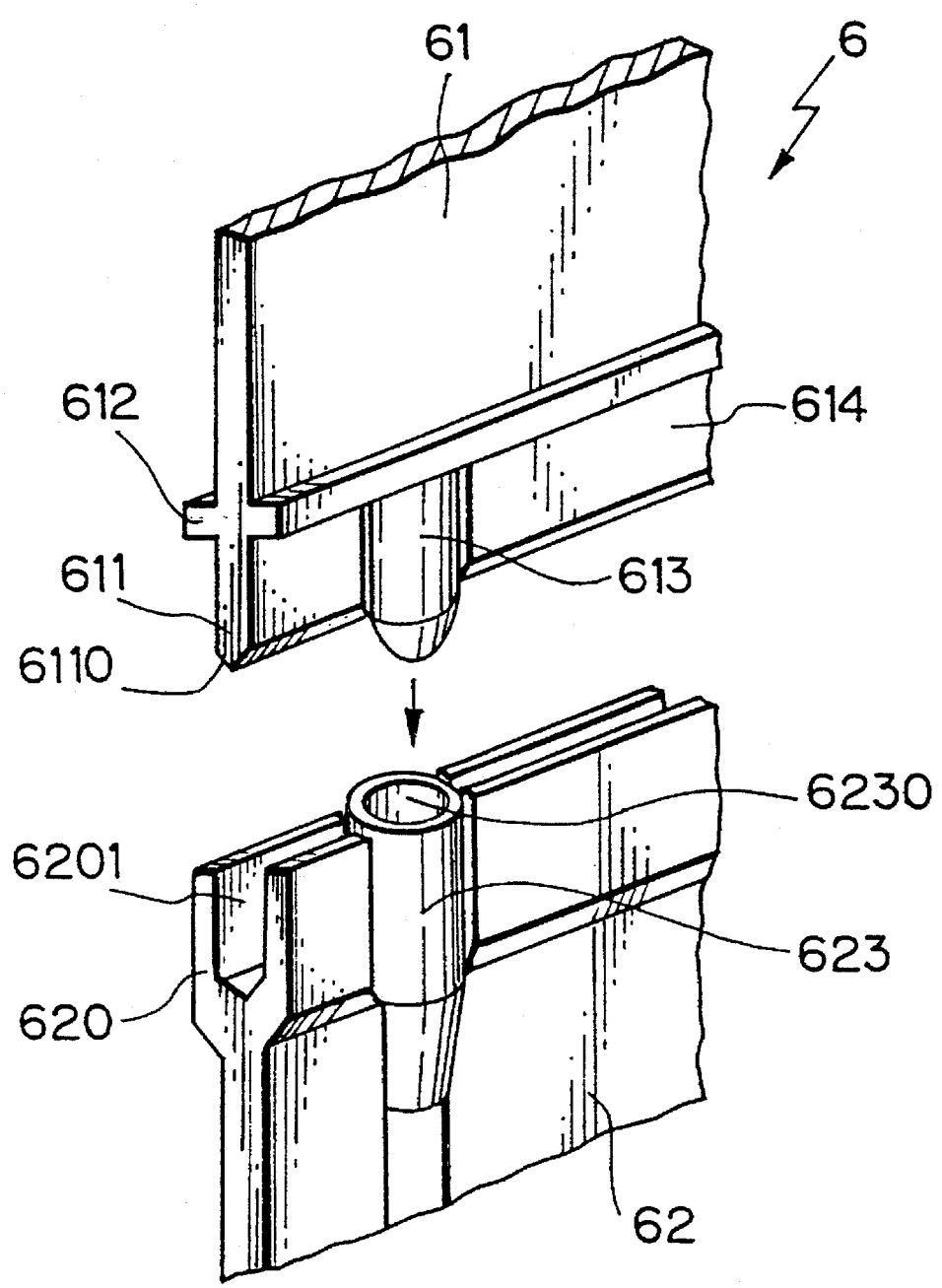

FIG. 30 shows a partial, perspective view illustrating a relationship between a pair of fitting lands prior to their fitting operation, the fitting lands being provided with a fitting pin and fitting hole.

Figure 31:
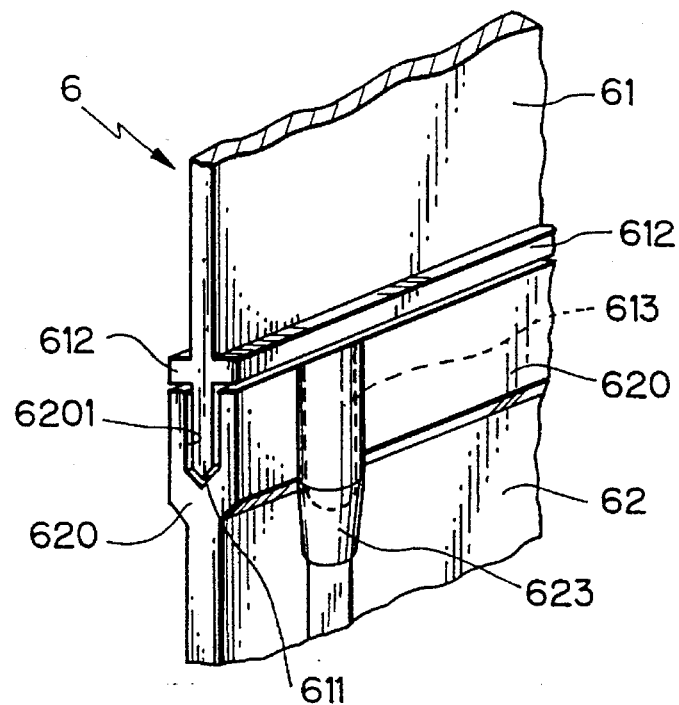

FIG. 31 is the same as FIG. 30, but shows a condition where the fitting is completed.

Figure 32:
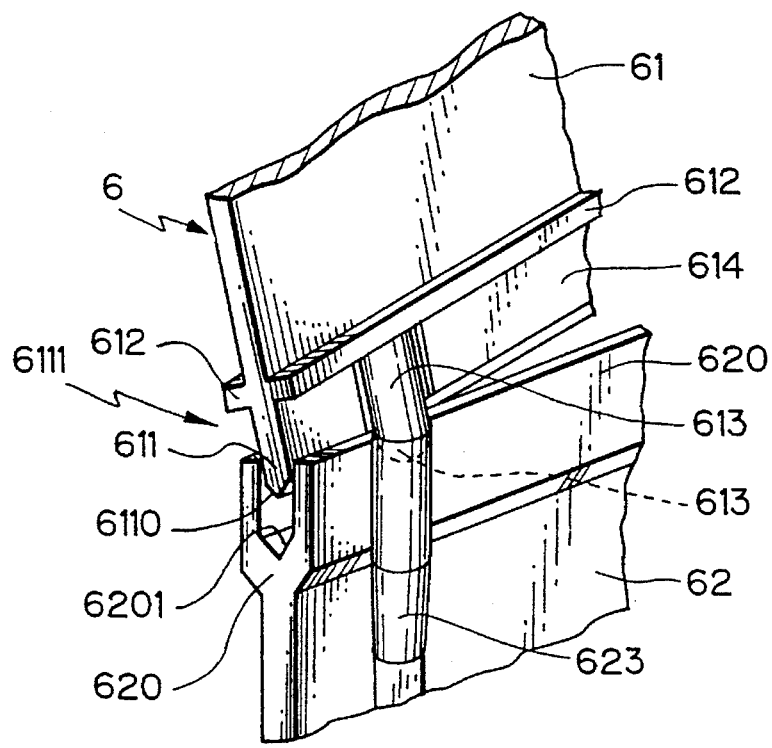

FIG. 32 is the same as FIG. 30, but shows a provisional fitting condition.

Figure 33:
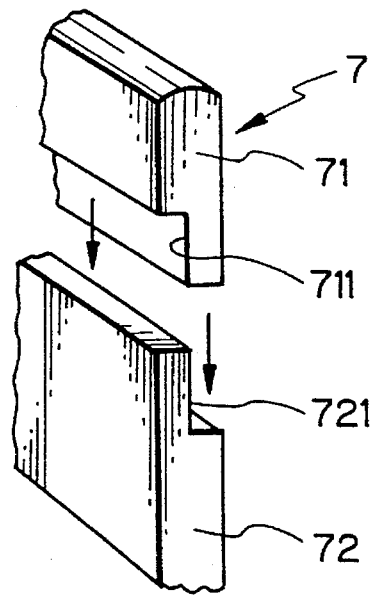
Figure 34:
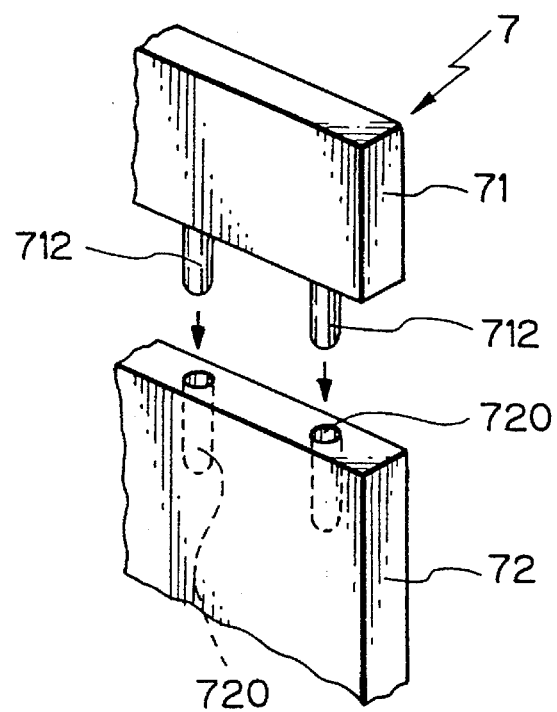

FIGS. 33 and 34 respectively show modified embodiment of fitting lands.

FIGS. 35-(a) and (b) illustrate how the self-guided fitting according to the present invention is done.

FIGS. 36-(a), (b) and (c) illustrate a correction of the relative deviation between the paired lands during the execution of the self-guided fitting operation according to the present invention, and are taken along line XXXVI in FIG. 35-(b).

DESCRIPTION OF PREFERRED EMBODIMENTS

Figure 1:
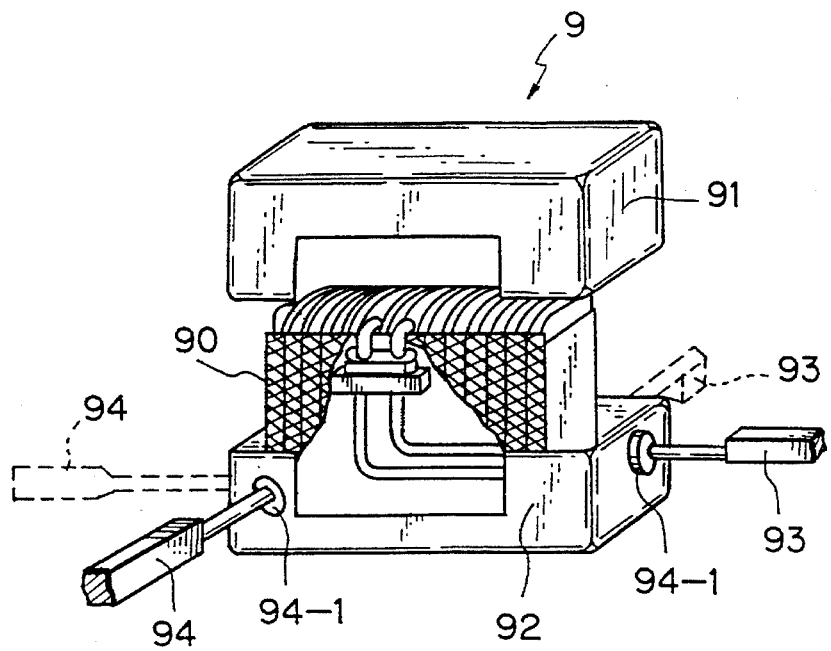
FIG. 1 is a schematic, general perspective view which shows a fitting operation of work-pieces in a prior art.
Figure 2:
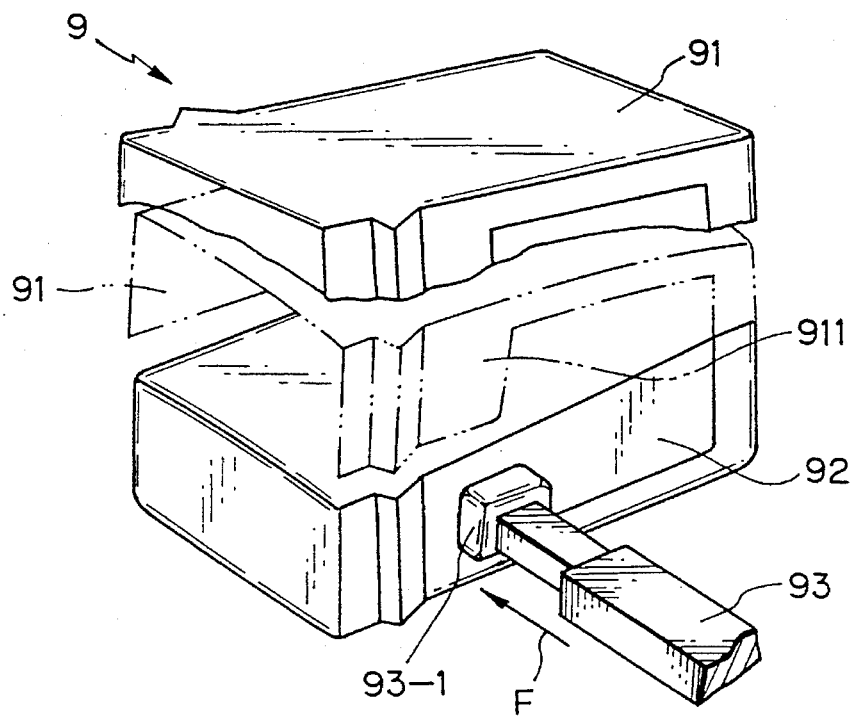
FIG. 2 is a schematic, partial-perspective view which shows a relationship between work-pieces to be fitted with each other.

Now, a problem to be solved by the present invention will be explained with reference to FIGS. 1 and 2. FIG. 1 shows a construction of a conventional cooler unit 9 for an air conditioner for an automobile. The cooling unit 9 is, at its center thereof, provided with an evaporator 90 in which a refrigerant passes, which is subjected to a heat exchange with a flow of the air for its cooling. The evaporator 90 is of a complicated structure constructed from various parts as assembled. Prior to mounting the evaporator 90 to an automobile, the evaporator 90 is connected to a mounting case which makes it easy for the evaporator to be assembled to the automobile. The mounting case is made of an upper and lower members 91 and 92 made from a certain plastic resin material. The upper case 91 has a downwardly opened recess for receiving a top part of the evaporator 90, while the lower case 92 has an upwardly opened recess for receiving a bottom part of the evaporator 90. Upon a connection of the evaporator 90 to the cooler unit 9, the evaporator 90 is, first, connected to the bottom case 92. Then, the top case 91 is connected to the top part of the evaporator, while the top and bottom cases 91 and 90 are connected with each other by means of a projection formed on one of the cases, which projection is fitted to a groove formed on the other case. Such a engagement between the projection and the groove is conventionally done manually.

Such a manual fitting operation using the groove is ineffective due to the fact that the shape of the case is complicated or diversified. Namely, the connection of the mounting case 92 can not be done effectively, so that the process is time consuming, causing the productivity to be reduced. In view of this difficulty, as shown in FIGS. 1 and 2, an improvement is provided, where positioning arms 93 and 94 are provided at sides of the case 92 for obtaining a fixed condition of the bottom case 92. Namely, the arms 93 and 94 are connected to respective actuators. The arms 93 and 94 have, at their ends, supporting members 93-1 and 94-1, respectively, which contact with respective facing sides of the bottom case 92. Namely, the actuators are operated so that the respective arms 93 and 94 are extended as shown by an arrow F in FIG. 2. During the mounting process, the upper case 91 is fitted to the bottom case 92, which is maintained at this fixed condition by means of the arms 93 and 94. This arrangement is effective for an automated process for assembling the top and bottom cases 91 and 92 with each other.

The use of the arms 93 and 94 causes, however, the portions 911 of the sides of the bottom case 92 to be deformed, due to the fact that the supporting member 93-1 and 94-1 at the end of the respective arms 93 and 94 are contacted with the portion 911. Due to such a deformation of the portions of the sides of the bottom case 92, where the arms 93 and 94 are contacted, a relative position between the top case 91 and bottom case 92 becomes different from the desired relative position. To obviate this problem, a number of the arms used is increased. However, such an increase in the number of the arms 93 and 94 causes the system to become complicated due to the fact that means for controlling the actuators are complicated and causes the system to become massive. Thus, a substantial increase in the cost of the system is inevitable.

Now, the first embodiment of the present invention for overcoming the above mentioned problem will be explained with reference to FIGS. 3 to 8. According to the present invention, a fitting system 8 is provided for obtaining a product 10 which is constructed from an upper section 101 and lower section 102, which are fitted with each other. The work-pieces are provided with a plurality of fitting lands 11, 12, 13 and 14 as shown in FIG. 6. As shown in FIG. 6, the lower section 102 of the product 10 is provided with four separated sections (fitting lands) 11, 12, 13 and 14, subjected to separate fitting operations with respect to corresponding fitting lands (not shown) in the opposite section 101 of the product 10, as will be fully described later. The fitting system 8 includes an unit 81 for holding one of the work-pieces (upper section 101) and for moving said one work-piece held by the unit 81 so that it is fitted to the other work-piece (lower section 102). According to the present invention, an order of the fitting operations between the paired fitting lands is initially determined in accordance with a degree of rigidity. A portion of an initially selected land (land of the least rigidity), which is within an assembling allowance, is determined. If such a portion does not exist, a relative movement is obtained between upper and lower work-pieces 101 and 102 until an assembling allowance is created, so that the fitting of the instant portion is executed. Then, a self-guided fitting is executed for the initially selected land. Then, a provisionally fitting state is, if necessary, created at a portion of the least rigidity in the first land in order to allow the second fitting land to be fitted. Then, with regard to the second fitting land, a portion within the assembling allowance is then determined. If such a portion does not exist in the second land, a relative movement is obtained until the assembling allowance is created, while the provisional fitting condition of the first selected land is maintained. Then, a provisional fitting state is also obtained for the second lands. These steps for obtaining fitting condition are repeated for the remaining fitting lands. Upon completion of the provisional fitting states for all of the lands, a complete fitting operation is executed to obtain a final product.

Figure 3:
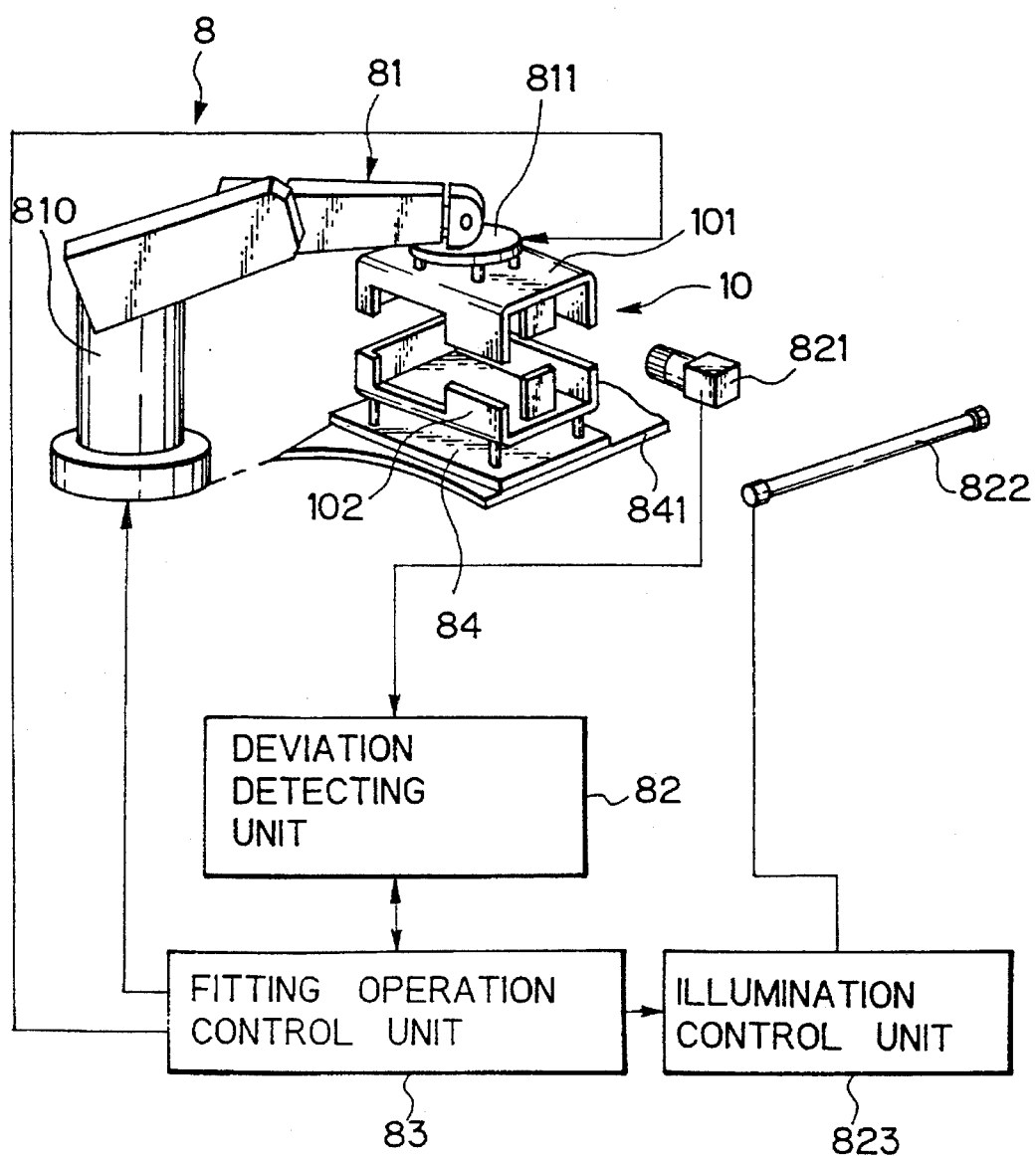
FIG. 3 is a schematic perspective view of a fitting device according to the present invention together with a system for controlling a fitting operation.

In addition to the above mentioned fitting unit 81 for moving the upper section 101 of the work 10 so that the upper section 101 is fitted to the lower section 102, while correcting the mutual position of the upper and lower sections 101 and 102 of the product 10, the fitting system 8 includes, as shown in FIG. 3, an unit 82 for detecting a deviation between the upper work section 101 and the lower work section 102, and a control unit 83 which is responsive to the information from the deviation detection unit 82 for operating the work-piece fitting unit 81.

According to the embodiment in FIG. 3, the work-piece fitting unit 81 is constructed by a robot 810 of a multi-articulation type including a hand 811 which is preferably extendable and rotatable along a conventional manner.

According to the embodiment in FIG. 3, the deviation detecting unit 82 is constructed as a device for treating images for obtaining information corresponding the relative deviation R between the upper and lower work-pieces 101 and 102. A video camera 821 for obtaining images of the work-pieces 101 and 102 is connected to the detecting unit 82. From these images, the detecting unit 82 detects a value of the relative deviation R existing between the upper and lower work sections 101 and 102. A reference numeral 822 denotes an illuminating device (illumination lamp) for generating an illuminating light toward the work-pieces 101 and 102 when the images are taken by the video camera 821. The illuminating device 822 is connected to an illumination control device 823, which is controlled by the fitting control unit 83.

Figure 4:
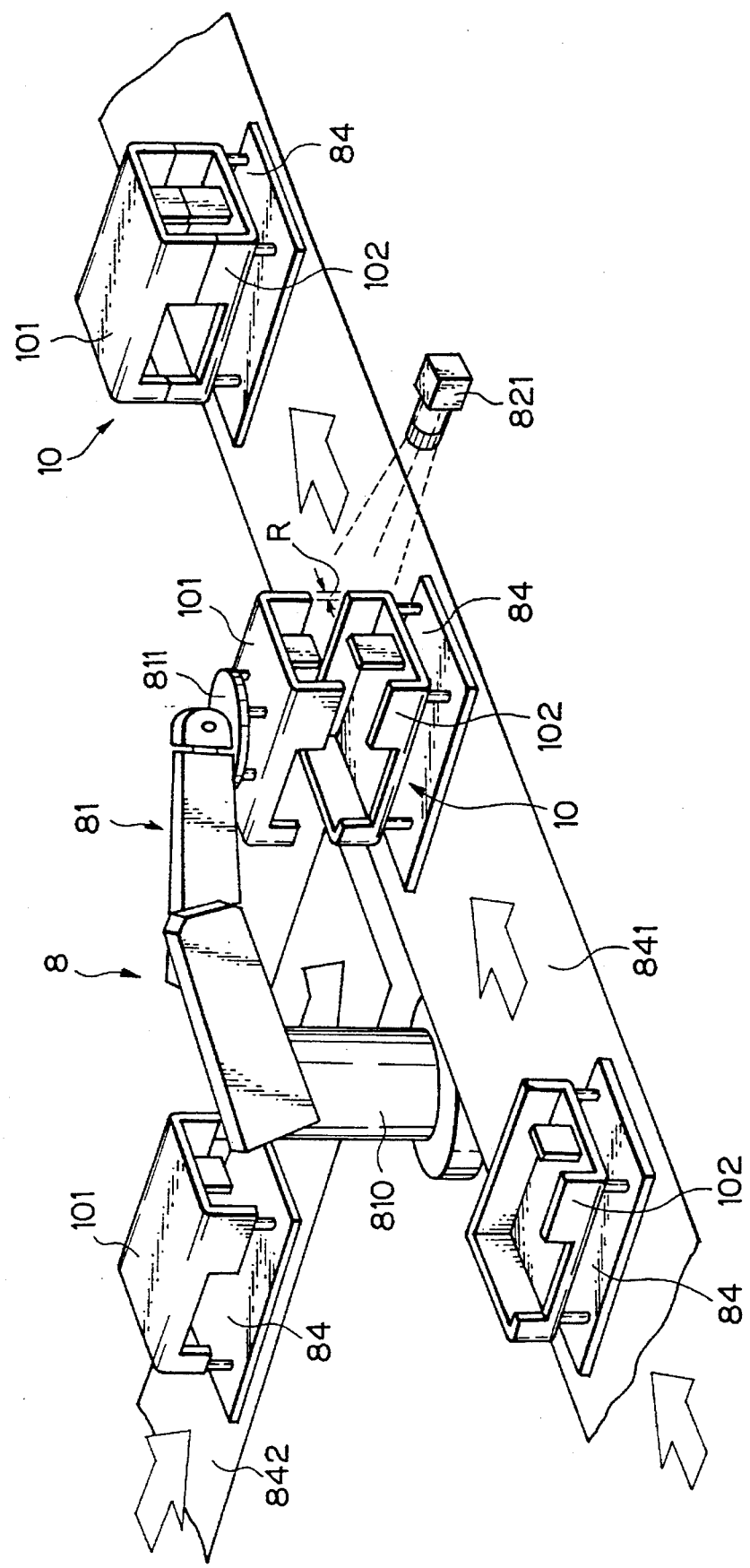
FIG. 4 is schematic perspective view of the fitting device according to the present invention together with conveyor lines for conveying work-pieces to be fitted with each other by means of the fitting device.

As shown in FIG. 4, first and second belt conveyors 841 and 842 are provided so that the directions of the movement of the belt conveyors 841 and 842 is crossed with each other at an angle of 90 degree. The first belt conveyor 841 is for conveying, thereon, the lower work sections 102 one after the other. The second belt conveyor 842 is for conveying, thereon, the upper work sections 101 one after the other. On the location (below, fitting location) of the first belt conveyor 841 where it is crossed with the second belt conveyor 842 with respect to a second work-piece on the conveyor 841 located on the fitting position, an upper work-piece 101 is fitted by means of the fitting unit 81 including the robot 810, which is located laterally adjacent the fitting location. In FIG. 4, a reference numeral 84 denotes an attachment for connecting each of the work-pieces to the conveyor 841 or 842, such as a pallet or chuck.

During the fitting operation of work 10 using the fitting system 8 according to the present invention, the relative difference of position between the upper and lower work-pieces 101 and 102 are detected by using the detecting unit 82 (FIG. 3) based on a treatment of images of the work-pieces 101 and 102 taken by the camera in a known manner. The signal from the detecting unit 82 indicating the deviation is transmitted to the control unit 83. The control unit 83 operates the work fitting unit 81 so that the deviation of the upper work section 101 to the lower work section 102 is canceled. Then, a series of fitting operations for the respective fitting lands is carried out in the increased order of rigidity of the work.

Now, the fitting process for fitting a work 10 having a plurality of fitting lands according to the present invention will be explained with reference to a flowchart in FIG. 5. At step S100, rigidities of fitting lands in the upper and lower cases (work-pieces) 101 and 102 are measured, and a relative deviation in the fitting lands between the cases 101 and 102 is measured. Known rigidity determining apparatus may be used to measure the rigidity of the fitting lands, such known apparatus being schematically illustrated as box 1 in FIG. 9. Those skilled in the art are familiar with such suitable apparatus. The step S100 is done before the execution of the fitting process. Namely, the process at the step S100 is done by an off-line computer 500 as explained with reference to FIG. 9, and the measured values are input to the fitting control unit 83.

FIG. 9 explains how the values of the relative deviation between the upper and lower sections 101 and 102 are obtained. Namely, the relative deviation R means values of a relative deviation R between the upper work 101 and lower work 102 in a horizontal plane at each of the fitting portions. These measurements are done for each of the work-pieces 101 and 102 by measuring the values of the deviation with respect to the desired value as obtained by the design of the product. In order to cancel a difference between work-pieces, the measurement is done for a number, between several to several tens, of work-pieces and the maximum values of the deviation among the measured values is treated as a data. The data is input to the fitting control unit 83 constructed as a microcomputer. From such input data, the control unit 83 executes the process for determination of the order of the fitting operations and for execution of the fitting operation. This process is shown by steps 101 to 111 in FIG. 5.

At step S101 in FIG. 5, a comparison is done between the values of rigidity of the fitting lands. At the following step S102, a fitting land of the least value of the rigidity is selected as the one which is subjected to the first order fitting operation. At the following step S103, it is determined based on the input data of the relative deviation, if, at the selected fitting land, a fitting portion exists which is within an assembling allowance condition. The assembling allowance condition is obtained when the value of the relative deviation of the work 10 is within such a range that, irrespective of the deviation, the work can be fitted with or without the aid of such means as taper portions formed at the tip end of the fitting portion. Namely, the relative deviation is within a range which is automatically canceled when the fitting operation is carried out. When such a fitting portion within the predetermined limit exists, i.e., a yes result is obtained at the step S103, the routine goes to step 104. To execute a fitting operation of the portion, the robot hand of the device 8 holds the upper work-piece 101 so that it is inclined with respect to the lower work-piece 102, and the upper work-piece 101 is moved downwardly so as to be engaged with the lower work-piece at the portion 111. Then the relative rotation of the work-pieces is continued to execute a self-guided fitting of the paired lands. Namely, from the portion being fitted an origin, a fitting of the paired lands is gradually proceeded upon as the relative rotation continue due to the elastic deformation of the land and due to the self-guided action of the lands as being fitted, as will fully described later. Contrary to this, a no result is obtained at step S103, the routine goes to step S107.

At step S104, the work fitting unit 83 is operated so that the fitting portion within the assembling allowance is subjected to the fitting operation. Then, the routine goes to step S105, where it is determined if a provisional fitting condition is necessary at the instant fitting land. The determination of the step S105 is done by checking if an elasticity of the initially fitted land is sufficient to allow a relative movement between the upper and lower work-pieces 101 and 102 to occur, which movement is necessary to allow the secondary selected land to be fitted. The provisional fitting state is obtained by disengaging the portion of the fitting land other than a portion of the least rigidity. Namely, in FIG. 6, suppose that the fitting is initially done at portion designated by a number of 111, which portion has a large value of the rigidity although the relative deviation is small. Thus, the provisional fitting condition should be obtained at the portion 112 of the smallest value of the rigidity, where a large value of the relative displacement between the upper and lower work-pieces can be obtained.

When a determination is obtained that the provisional fitting condition is necessary at the step S105, the routine goes to step S106, where a provisional fitting condition is taken in such a manner that fitting portions other than the portion of the smallest rigidity, which is initially brought to the fitting condition, are disengaged. This provisional fitting condition is such a condition that the constraint is once canceled at the other fitting portion or a condition that the fitting is partially released at the other engaging portions. In order to do this, the robot hand execute a relative movement between the work-pieces 101 and 102 so that they are inclined with each other. As a result, the lands are, as shown in FIG. 32, disengaged from each other except at a location of the least rigidity to obtain the provisional fitting condition. When it is determined that the provisionally fitting condition is not necessary, the step S105 is bypassed, and control passes to step S109.

When it is determined at the step S103 that there is no fitting portion within the assembling allowance at the instant fitting land, i.e., NO result is obtained, the routine goes to step S107, where the relative deviation R at the fitting portion of the smallest rigidity at the fitting land designated at the time is detected by the deviation detector device 82. At the following step S108, the detected deviation is input to the fitting control unit 83, so that a signal is directed to the fitting unit 81 for causing the relative deviation R to be compensated. Then, the routine goes from step S108 to step S104, which allows the fitting operation of the work to be commenced by the work fitting device as the deviation is compensated.

At step S109, a determination is done if another fitting land to be fitted remains. When it is determined that no land to be fitted reins, i.e., no result is obtained, the routine goes to step S110 where, for all of the fitting lands, a self-guided fitting operation is done. Namely, a relative movement is obtained between the work-pieces 101 and 102 so that all of the lands 11 to 14 under the provisional fitting states are completely fitted. Contrary to this, when a determination is obtained that a land to be fitted remains at step S109, i.e., yes result is obtained, the routine goes to step S102 for repeating the above mentioned process. When the fitting of the all of the lands is completed, the routine goes to step S111.

The above mentioned fitting operation done by the fitting system 8 according to the present invention is advantageous in view of the following points. The employment of self-guided fittings according to the present invention is effective for obtaining a reliable fitting operation irrespective of a small number of operating units, which only includes the work fitting unit 81, the deviation detecting unit 82 and the fitting control unit 83. As a result, an automated fitting operation is realized, while keeping the construction simple and cheap. Unlike the prior art where an outside force is required by means of arms of a variety of actuators, the construction of the present invention is very simple.

Furthermore, the fitting system 8 according to the present invention can obtain a desired operation even in the case where the shape and the number of the fitting lands are diversified. Namely, by means of the work-piece fitting unit, the work-pieces can be positively held with a high precision, while preventing work from being damaged. Namely, the work-pieces are firmly held irrespective of various forces generated therein due to the fitting operation, such as fitting forces, operating forces and inertial forces.

Now, an actual fitting process according to the present invention executed along the flow chart in FIG. 5 will be explained with reference to FIGS. 6 to 8. Namely, as shown in FIG. 6, the lower work 102 has four fitting lands 11, 12, 13 and 14. In order to obtain a fitting operation of these lands 11, 12, 13 and 14, the rigidity of each of the lands are detected and compared with each other (step S101 in FIG. 5). FIG. 7-(A) shows, with respect to the fitting lands, relationships between rigidity and a relative deviation. As will be easily seen, among the fitting lands, the fitting land 11 has the smallest value of minimum rigidity. The rigidity is increased in the order of the second fitting land 12, the third fitting land 13, and the fourth fitting land 14. Throughout FIGS. 7 and 8, a line 15 shows a limit of the movable distance of the work-piece with respect to the total value of the rigidities of the fitted fitting portion(s) while the fitting condition is maintained. The value of the movable distance is shown on the right side coordinate. The movable limit line 15 is, as shown in FIGS. 7-(A) and (B), constructed by a first limit line section 151 which is constant irrespective of the rigidity and which indicates a limit where a relative movement of work-pieces as fitted causes the fitted portion to be disengaged or withdrawn, and a second limit line 152 which is varied in accordance with the rigidity and which indicates a limit where a relative movement between work-pieces under a fitted condition causes the fitted portion to be damaged. The line 152 shows that larger the rigidity smaller the value of the relative deviation which causes the fitting portion to be damaged.

In view of the above, the order of the fitting process is determined between the lands and between the fitting portions of each of the lands (see step S102 in FIG. 6). Furthermore, a determination is done if the fitting land(s) are within the assembling allowance (see step S103 in FIG. 6).

Based on the above determination of the order of the fitting process, the fitting is done in the order of the first fitting land 11, the second fitting land 12, the fitting land 13 and the fourth fitting land 14, as illustrated in FIG. 7-(B).

This order of the fitting process will be explained with reference to FIGS. 8-(A) to 8-(G). These Figures show, as in FIGS. 7-(A) and (B), the relationship between the rigidity in abscissa and the relative deviation for the respective fitting lands in ordinate. Namely, at first, the fitting portion 111 of the first fitting land 11 within the assembling allowance is fitted by means of the work fitting unit 81 (see step S104 in FIG. 5). This causes a relative deviation at the portion 111 to be nullified due to the movement of the portion 111 as shown by an arrow F1, which causes the characteristic curve of the relative deviation of the first land 11 to be displaced from a position 11A in a dotted line to a solid line. Next, as shown in FIG. 7-(B), from the fitted portion 111 of the first fitting land as a starting point, a self-guided fitting is done up to the portion 112 of the lowest rigidity. Due to the existance of the self guided fitting, the relative deviation of the first fitting land 11 is nullified at every portion along arrows F2 in FIG. 8-(B). Then, as shown in FIG. 8-(C), a provisional fitting condition is obtained, wherein the fitted portion(s) other than the portion 112 of the lowest rigidity is partially disengaged (see step S105 in FIG. 5 and FIG. 32). The provisional fitting condition makes it possible that the fitting process of the other fitting portion is eased at the later stage due to the fact that a large displacement is obtained under the elasticity of the portion of the land under the provisional fitting condition. Next, as shown in FIG. 8-(D), a fitting process of the second fitting land 12 is carried out. Namely, a portion of the fitting land 12 is brought to a condition of an assembling allowance. Then, a fitting process is executed for the second land. Finally, a provisional fitting condition is obtained so that the portions of the second land 12 other than the least rigid portion 112 is disengaged. Thus, the characteristic curve as shown by a dotted line 12A before commencement of the fitting operation is displaced as shown by a solid line, along the direction of arrow F4. After this process, a check of the fitting operation of all of the fitting lands is done to detect if an unfitted fitting land remains (see step S109 in FIG. 5). Next, as shown in FIG. 8-(E), a fitting process of the third fitting land 13 is executed so that the characteristic curve in the dotted line 13A prior to the fitting operation is displaced as shown by a solid line along an arrow F5. Then, as shown in FIG. 8-(F), a fitting process of the fourth fitting land 14 is executed in the similar manner as shown by an arrow F6. Thus, a provisional fitting condition is also obtained for the land 14. Finally, as shown in FIG. 8-(G), a complete fitting operation of the all of the fitting lands under the provisional fitting condition as shown by dotted curves is executed, so that the fitting operation process is completed to obtain a finished product as shown by arrows F7, F7', F7" and F7'".

As explained above, according to the first embodiment, the fitting operation is sequentially executed in the order of the rigidity from the fitting land of a lower value of rigidity. Furthermore, in each of the fitting lands, the fitting is executed in the order of a fitting portion within the assembling allowance and then a fitting portion of the lowest value of the rigidity. As a result, a fitting operation of work-pieces having a plurality of fitting lands is easily and reliably carried out. Such fitting operation according to the present invention is obtained by correcting relative deviation between the work-pieces and by a self-guided fitting effect. In short, according to the present invention, an idealized fitting operation is executed irrespective of a fact that the work has a complicated shape and the work of various types is performed. Thus, the efficiency of the fitting operation is increased. Furthermore, according to the above description, the embodiment is directed to the work-pieces having a plurality of fitting lands. However, the present invention can be applied to a work having only one fitting land or of a relatively simplified shape. Furthermore, according to the present invention, an automated fitting operation is realized, which allows the speed of the fitting operation to be increased, thereby increasing the labor efficiency.

Now, FIGS. 35 and 36 illustrate how the self-guided fitting according to the present invention is executed. In FIG. 35-(a), an upper work-piece has a land L1 of a plate shaped projection, while a lower work-piece has a land L2 having a groove G to which the land L1 is engaged. The land L1 of the upper work-piece has a portion L1A of a higher rigidity and of a smaller deviation and a portion L1B of a smaller rigidity and of a higher deviation. Namely, the first portion L1A can be fitted to the groove G since the deviation is small. The second portion L1B is curved, which makes it difficult the portion L1B to be fitted to the groove G of the second land L2. According to the present invention, a relative rotational movement is applied to the upper and the lower work-pieces, which makes it possible that the portion L1A of the least rigidity and of a smaller deviation to be fitted to the groove G of the lower land L2, as shown in FIG. 35-(b). Then, a relative rotational movement is applied to the upper and lower work-pieces as shown by an arrow F. The upper land L1 has a certain amount of an elasticity. Due to such an elasticity, the relative rotation as shown by the arrow F allows the second portion L1B to be engaged with the groove B under a self-guided manner, as the relative rotation as shown by the arrow F proceeds. Thus, the deviation of the portion L1B at the upper land L1 from the corresponding portion in the lower land L2 which is outside the assembling allowance is gradually and automatically corrected by the self-guided operation according to the present invention. Namely, at points A, B and C in FIG. 35-(A), the relationships between the upper land L1 and the lower land L2 are as shown by FIGS. 36(A), 36(B) and 36(C), respectively. The deviation at the point A or B before the contact of the upper and the lower land is larger than the assembling allowance. However, the deviation at the contacting point C, the deviation is corrected due to the elastic deformation, which allows the fitting to take place. The self-guided operation which occurs as the relative rotation proceeds allows the condition in FIG. 36-(b) or (a) to be gradually changed to the condition in FIG. 36-(c), which allows the entire upper land L1 to be finally completely fitted to the lower land L2.

Next, according to the present invention, it is desirable that the provisional fitting condition is obtained by using fitting pins as shown in FIGS. 30 to 32, which fitting pins are used for obtaining the above mentioned provisional fitting condition. Namely, according to the first embodiment, the portions of the least rigidity are the ends of the fitting lands 11, 12, 13 and 14 shown by the reference numbers 112, 1122, 132 and 142, respectively. Provided at the least rigidity portions are fitting pins 613 as shown in FIGS. 30 to 32. Provided at the ends of the corresponding fitting lands of the upper work-pieces are fitting openings 6230 for obtaining the provisional fitting condition of the fitting pins 613. These fitting pins 613 and the fitting opening 6230 are brought to the provisional fitting condition by obtaining a relative rotation between the lands 61 and 62 of the upper and lower work-pieces as shown in FIG. 32, while the fitting operation of the remaining fitting lands is executed. Such creation of the provisional fitting condition between the fitting pin and the fitting hole will be fully explained later in relation to the fifth embodiment.

In a second embodiment, as shown in FIGS. 9 to 11, prior to the fitting operation, (1) a measurement of the rigidity of the work-piece and a measurement of the relative deviation between the upper and lower work-piece sections by the deviation detecting device 821, (2) an input of the measured data, (3) the determination of the order of fitting operation and the locations where the detecting device 821 should be operated for the measurement of the deviation, and (4) a transmission of the data to the fitting device 8 are done in the separate off-line computer 500 independent from the fitting operation. Contrary to the first embodiment in FIG. 5, only a measurement of the rigidity of the work pieces and a measurement of the relative deviation between the upper and lower work sections, and input of the measured data are done at the off-line computer 500, and the remaining operation are executed at the on-line computer 8 while the fitting operation is executed. This second embodiment can increase the number of the steps done at the off-line computer 500.

FIG. 9 illustrates how the off-line operation independent from the fitting process is executed in the second embodiment. As for the off-line operation, as explained above, (1) the rigidity of each fitting portion in the upper and lower cases 101 and 102 and the relative deviation R, R', R" and R'" between the cases are measured.

Next, (2) these measured data are input to the off-line computer 500 constructed from a microcomputer for determination of the order of the fitting operation. Then, (3) at the microcomputer 500, based on the input data, the order of the fitting operations is determined, the kind of the fitting operation is determined, i.e., it is determined if the fitting operation to be done is a mere fitting operation or a provisional fitting condition, and the location where the deviation detection device (the error sensor 821 in FIG. 3) operates is determined. These determinations are carried out in accordance a flow chart as illustrated in FIG. 10. The information as obtained by the execution of the program as shown in FIG. 10 is introduced into the fitting control unit 83 of the fitting control system 8 as shown in FIG. 3. The fitting control unit issue commands determined in accordance with the routine in FIG. 10. During the execution of the fitting operation, as for the lands where the relative deviation exists, the unit 8 can correct, in an on-line manner, a deviation detected by the sensor, such as a video unit 821, prior to the execution of the fitting operation.

Now, the method in the second embodiment will be fully explained with reference to a flowchart in FIG. 10. In this embodiment, the work-piece 10 to be treated is the same as illustrated with reference to the first embodiment. At the initial step T100, a rigidity of fitting portion of the fitting land and a relative deviation between upper and lower work-pieces are measured. The result of this measurement is input to the device for determination of the order of the fitting operations constructed from a microcomputer. At the fitting order determination device, the routine for determining the fitting order is done along steps T101 to T110, so that the order of the fitting operation is finally determined at step T111. These steps T101 to T110 in FIG. 10 are the same to the step S101 to S110 in FIG. 5 in the first embodiment except that actual fitting operation is not done. Note; in the first embodiment, the order of the fitting operation is determined while the fitting operation is executed at the steps S101 to S110. Contrary to this, in the second embodiment, only the order of the fitting operation is determined by the execution of the steps T101 to T110.

In accordance with the second embodiment, after the determination of the order of the fitting operation, the on-line fitting system 8 (FIG. 9) executes the fitting operation along the flowchart as shown in FIG. 11. This flowchart shows how the fitting operation is executed for the work as shown in FIG. 6. At step P101, the fitting is done at the fitting portion 111 of the first fitting land 11. Then, at step P102, at the fitting land 11, a self-guided fitting is done from the highest rigidity portion 111 to the lowest rigidity portion 112, and, then a provisional fitting condition is obtained where the fitted portions other than the least rigidity portion are disengaged. At step P103, a measurement is done as to a relative deviation (error) between the upper and lower sections of the work-piece at the fitting portion 122 in the fitting land. At step P104, the correction of the relative deviation between the upper and lower sections at the fitting portion 122 is done by obtaining a corresponding relative deviation for canceling the same. At step P105, the fitting operation of the fitting portion 122 is executed. At step P106, a relative deviation is measured between the upper and lower section at the fitting portion 132 in the second fitting land 13. At step P107, for the fitting land 132, a correction of the relative deviation between the upper and lower sections is done. At step P108, the fitting operation of the fitting portion 132 is executed. At step P109, a fitting of the fitting portion 142 in the fitting land 14 is done. At step P110, a self-guided fitting is done for all of the fitting lands 11, 12, 13 and 14.

A third embodiment will be described with reference to FIGS. 11 to 25. Unlike the work-piece 10 in the first embodiment, the work-pieces are provided with two fitting lands. The fitting system as explained in the first embodiment may be used for executing the fitting operation. A routine similar to that explained in FIG. 5 is executed. As shown in FIG. 12, the product 5 is constructed by an upper section 51 and a lower section 52. These upper and lower sections 51 and 52 have interrupted structure. The product 5 is, for example, a part for an air conditioning device for an automobile.

As shown in FIGS. 13 and 14, the upper work-piece 51 is provided with a pair of side portions 511 and 512 constructing fitting lands, respectively, each having a bottom portion 510 having a tip end 510 tapered downwardly. At a location above the tapered tip portion 510, the work-piece is provided with a flange portion 5102 extending horizontally. Contrary to this, the lower work-piece 52 has a pair of side portions 521 and 522, each having a top portion 520 defining outwardly opened recess 520, to which the tapered portion 510 of the upper work-piece 51 is fitted. In FIG. 13, the land 511 (solid line in FIG. 15) is under a condition where no deviation exists between the upper and the lower work-pieces, so that a fitting operation in a direction as shown by an arrow G1 is possible.

FIG. 14 shows a relationship between the upper work-piece 51 and a lower work-piece 52 when a deviation R exists therebetween due to the deformation of the work when it is produced, when the first land 510 of the upper work-piece 51 is under a provisional fitting condition with respect to the land 522 of the lower work-piece 52. The value of the deviation R is a horizontal distance between the axis of the bottom projection 510 of the upper work-piece 51 and the axis of the recess 5201 of the lower work-piece 52. An existence of the deviation R prevents the fitting operation from being executed between the upper and lower work-pieces. Thus, a relative movement is necessary between the upper and lower work-pieces. As a result, the land as shown in the dotted line in FIG. 15 is displaced to the position as shown by a solid line due to the elastic deformation of the land 510 as shown by a dotted line in FIG. 15 which is under the provisional fitting condition. Thus, the fitting of the land 511 becomes to be possible.

Now, the fitting operation between the upper work-piece 51 and the lower work-piece 52 by means of the projected portion 510 and the recess 5201 will be explained in a detailed manner. First, as shown in FIG. 12, for the opposite side portions 512 and 522 to be fitted, in the direction (horizontal direction) as shown by arrows transverse to the direction (vertical direction) of the fitting operation, the degree of the rigidity and a relative deviation between the portions 512 and 522 are measured. This process corresponds to the step S100 in FIG. 5.

Next, a comparison is done to determine the portion of the lowest rigidity in the each of the fitting land as in the step S101 in FIG. 5. In this case, the side portions 521 and 522 construct fitting lands, respectively. Then, a determination of the order of the fitting is done between the fitting lands, that are, the side portions 521 and 522. This step corresponds to step S102 in FIG. 5. Then, based on these information, the fitting control unit 83 operates the fitting unit 81 for commencing the fitting operation. Upon the fitting operation, as shown in FIGS. 16 and 17, a fitting operation of a fitting portion 5221 which is determined as being one within the assembling allowance line 513 (step S103 in FIG. 5) is done by means of the work fitting unit 81 in FIGS. 3 and 4 (step S104 in FIG. 5). Namely, as shown in FIGS. 16 to 17, the robot 810 in FIG. 3 applies a rotating movement to the upper work-piece 51 about the fitting portion 5221, which is the portion of the lowest value of the rigidity and is within the assembling allowance line. Thus, the portion 5221 located in a dotted line 5221 is displaced to a fitted position as shown by a solid line along a direction h1 in FIG. 17. Then, so that a self-guided fitting of the remaining portion in the right side portion 522 of the lower work-piece 52 is executed along the arrow 517. Namely, the portion 5222 of the largest deviation is fitted as shown by an arrow h2. Thus, a fitting process of the side portion 522 is done as shown in FIG. 18, so that a condition is obtained where no deviation exists in the land 522 as shown in FIG. 19. Then, a determination is done if, for the land 522, it is necessary to obtain a provisional fitting condition (step S105 in FIG. 5). When the answer is yes, as shown in FIGS. 20 and 21, the fitted portions of the right hand side 522 of the lower work-piece 52 are released except the portion 5222 of the lowest value of the rigidity, so that the provisional fitting state where the land 522 of the work-pieces are disengaged is except at a position 5222 other than the least rigidity as shown in FIG. 21 in a direction of arrow h3.

Next, under this provisional fitting state, as shown in FIGS. 22 and 23, for a portion 5222 of the least rigidity as an origin, a fitting is executed. Namely, the fitting land 521, which is at a position as shown by dotted line 521A, is displaced along the arrows h4. Thus, a provisional fitting state is obtained also for this land 521, where the portions other than the least rigidity portion 5222 is disengaged. Then, as shown in FIGS. 23 and 24, for the all of the fitting lands, a self-guided fitting is executed. Thus, the lands 521 and 522 under the provisional fitting state in dotted lines are fully engaged as shown by solid lines in FIGS. 25 in the direction of arrow h5. As a result, fitting operation of the work-piece is completed (step S111).

As explained above, according to this embodiment, a fitting operation of a work-piece 5 using a recess can be easily carried out, and a similar effect as in the first embodiment can be obtained. Furthermore, as shown in FIGS. 13 and 14, the right and left sides 511 and 512 of the work-piece (upper section) 51 have tapered bottom end portions 5101, so that the fitting operation to the recess 5201 of the lower work-piece 52 becomes effective.

FIGS. 26 to 29 illustrate a fourth embodiment of the present invention. In this embodiment, as shown in FIG. 28, the work-piece 10 has feather portions 1011 and flange portions 1012, which are effective of obtaining the provisional fitting state. Similar to the previous embodiments, a fitting operation of the least rigidity land 101 is executed then a fitting operation of the remaining fitting portions is carried out. During the second stage fitting operation, upon an occurrence of a fitting portion which is difficult to execute a fitting operation, a provisional fitting state is obtained, as shown in FIG. 29. Namely, the fitting portions other than the least rigid portion 1012 in the initially fitted land are provisionally "floated" in the recess 1020 in such a manner that a relative movement between the upper and lower work-pieces is allowed due to the elasticity of the work pieces so that the second land is transversely displaced to bring a condition where its fitting is possible. As a result, the relative deviation between the work-pieces at the fitting portion, where the fitting operation is difficult, is compensated, allowing the fitting operation to be executed.

In this embodiment, the work-piece 10 is constructed from an upper work-piece 101 and a lower work-piece 102. As shown in FIGS. 28 and 29, the upper work-piece 101 is provided with a bottom feather portion 1011 and a horizontally extending flange portion 1012 spaced from the tip end of the portion 1011. Contrary to this, the lower work-piece 102 has recess 1020 for engaging with the feather portion 1011 of the upper work-piece 101. Similar to the subsequent embodiments, paired fitting lands in these upper and lower work-pieces 101 and 102 are subjected to a sequential fitting process according to the present invention. Namely, as shown in FIGS. 26-(A) and 27-(A), a fitting of a portion 111 of a first fitting land 11 within the assembling allowance is carried out in a direction in an arrow $J_1$. Thus, the fitting land 11 in a dotted line 11A is displaced to a condition as shown by a solid line. Then, as shown in FIGS. 26-(B) and 27(B), from the initial fitting portion 111 to the fitting portion 112, a self-guided fitting is executed for the first land. Thus, the fitting land 11 as shown by a dotted line 11B is displaced to a position as shown by a solid line. Next, as shown in FIGS. 26-(C) and 27-(C), a provisional fitting state is obtained where the fitting portions other than the least rigidity portion 112 is partially floated. Thus the fitting land 11 in dotted line 11c is displaced to a condition as shown by a solid line in a direction of an arrow $J_2$. Then, as shown in FIGS. 26-(D) and 27(D), a fitting operation is carried out for the remaining fitting lands 12, 13 and 14, while the provisional fitting states are obtained for each of the fitting means. Finally, as shown in FIGS. 26-(E) and 27-(E), the fitting of the work 10 is completed. These, process allows the work to be easily and positively fitted.

FIGS. 30 to 32 show a fifth embodiment, where the work 6 is provided with an engaging pin 612 and an engaging bore 6230, which makes it easy to obtain the provisional fitting state. According to this embodiment, after the engagement of the lower rigidity portions 6111, 613 and 623, the remaining portions are fitted. During this fitting process, when a portion which is difficult to fit is to be fitted, the once fitted portions 614 other than the least rigidity portions 6111, 613 and 623 are partially disengaged to the provisional fitting state. Then, the fitting operation is continued, while correction of the relative deviation is executed.

As shown in FIGS. 30 to 31, the product 6 in the fifth embodiment is constructed by an upper work-piece 61 and a lower work-piece 62. As shown in FIGS. 30 to 31, the upper work piece 61 is provided with a fitting pin 613 and a flange 612 above the pin 613. The upper work-piece 61 is further provided with downwardly extending portions 614 with tapered end portions 6110. The lower work-piece 62 is provided with an upper portion 620 defining upwardly opened recess for receiving the bottom fitting portions 6110 of the upper work-piece 61. Upon the engagement of the upper work-piece 61 with the lower work-piece 62, the bottom projection 611 is, as shown in FIG. 31, fitted to the fitting groove 6201, on one hand, and the fitting pin 613 is fitted to the fitting opening 6230. Furthermore, the provisional fitting condition is obtained by a condition that the least rigidity portion 6111 of the bottom projected portion 611 is engaged with the fitting groove 6201, that the fitting pin 613 is engaged with the fitting opening 6230, and that the remaining fitting portion 614 is at least partially disengaged. This construction is advantageous in that the provisional fitting state is reliable due to the employment of an engagement between the pin 613 and bore 6230.

In the similar way as in the preceding embodiments, the provisional fitting state is obtained when a fitting operation at the remaining fitting portion is difficult due to a large value of the relative deviation in a paired lands between the upper and lower work-pieces. After the correction of such a deviation, a fitting operation is executed under more reliable manner when compared with the fourth embodiment.

FIG. 33 illustrates a 6th embodiment, where, in place of fitting between a projection and a groove in the first embodiment, a face contact fitting is employed. In this face contact fitting, the upper work-piece 71 has a recess 711, while the lower work 72 is provided with a recess 721, which is complimentary with the recess 711. These recess 711 and 721 are under contacted with each other under the face to face relationship. The face contacting is advantageous in that the fitting operation is easy, and a speed of the operation is enhanced.

FIG. 34 illustrates a seventh embodiment, where, as for the fitting member, a pair of spaced apart fitting pins can be employed. In this case, the product 7 is constructed by an upper and lower work-pieces 71 and 72, which is fitted with each other. The upper work-piece 71 is provided with a pair of spaced apart rods 712, which are fitted to corresponding holes 720 formed in the lower work-piece 72. Such a construction of the fitting portions allows the fitting operation to be eased. Furthermore, a reliable provisional fitting state is obtained where the fitting portions are partially disengaged.

While the present invention is explained with reference to embodiments, many modifications and changes can be made by those skilled in this art, without departing from the scope and sprit of the present invention.

We claim:

1. A method for fitting two work-pieces separated with each other and having at least two pairs of fitting lands, comprising the steps of:

(a) providing holding means for stationary holding one of the work-pieces;

(b) providing fitting means for movably holding the other work-piece, said fitting means being capable of moving the other work-piece toward said one work-piece;

(c) determining a consecutive order of fitting operations between the at least two pairs of fitting lands;

(d) determining if an initially selected pair of fitting lands to be subjected to a first stage fitting operation has a fitting portion which is within a first range of assembling allowance;

(e) upon a determination that the initially selected pair of the fitting lands is out of the first range of assembling allowance at the step (d), correcting a relative deviation in the initially selected pair of fitting lands by moving the other work-piece with said fitting means so that the initially selected pair of fitting lands is within said first range of assembling allowance;

(f) with regard to the initially selected pair of fitting lands within the first range of assembling allowance, executing a fitting operation by moving the other work-piece with said fitting means so that the initially selected pair of fitting lands are in a provisionally fitted condition;

(g) with regard to fitting lands to be fitted in a secondary stage fitting operation, determining if a secondary selected pair of fitting lands subjected to the secondary stage fitting operation has a fitting portion which is within a second range of assembling allowance;

(h) upon a determination that the secondary selected pair of fitting lands in the secondary stage fitting operation is out of the second range of assembling allowance at the step (g), correcting a relative deviation in the secondary selected lands by moving the other work-piece with said fitting means so that the secondary selected pair of fitting lands is within the second range of assembling allowance, while maintaining the provisional fitting condition of the initially selected fitting lands; and (i) with regard to the secondary selected fitting lands within the second range of assembling allowance, executing a fitting operation by moving the other work-piece with said fitting means so that the secondary selected pair of fitting lands are in a provisionally fitted condition with each other.

2. A method according to claim 1, wherein the fitting operation of steps (f) and (i) comprise bringing said initially and secondary selected pairs of fitting lands to a provisional fitting state where fitting portions other than a selected portion of said initially and secondary selected pairs of fitting lands are at least partially disengaged; and further comprising, after the provisional fitting state is obtained for the selected pairs of lands of the work-pieces, executing a self-guided fitting operation until the other portions of the lands are fully fitted.

3. A method according to claim 1, wherein the determination of the order of the fitting operations in step (c) is such that fitting lands of a lower rigidity are subjected to the initial stage fitting operation, and fitting lands of a larger rigidity are subjected to the secondary stage fitting operation.

4. A method according to claim 1, wherein the correcting step in (e) or (h) comprise the steps of:

upon a determination that one of the selected pairs of fitting lands is out of its respective range of assembling allowance, moving the other work-piece so that a portion of its respective fitting land that has a lower value of rigidity than other portions of the fitting land is brought into the respective range of assembling allowance; and bringing said fitting land to a provisionally fitting state where said other portions of the fitting land are at least partially disengaged.

5. A method according to claim 1, wherein said fitting in step (f) comprises the steps of:

upon a determination that the initially selected pair of fitting lands is in the first range of assembling allowance, executing a fitting operation of a portion of the initially selected pair of fitting lands;

bringing said fitting land to a provisionally fitted state where fitting portions other than a least rigid portion are at least partially disengaged so that only the least rigid portion is in a fitted condition; and executing a self-guided fitting operation until said other portions of the land are fully engaged.

6. A method according to claim 5, wherein in the provisionally fitted state where the least rigid portion is in a fitted condition, said other portions are fully disengaged.

7. A method according to claim 5, wherein in the provisionally fitted state where the least rigid portion is in a fitted condition, said other portions are partially disengaged.

8. A method for fitting two work-pieces separated with each other and having at least two pairs of fitting lands, comprising the steps of:

(a) comparing the at least two pairs of fitting lands by their least values of rigidity to select a first fitting land providing a lower value of least rigidity than the remaining fitting lands which have a higher value of least rigidity;

(b) executing a fitting operation on the first fitting land to obtain a provisional fitting condition where only a portion of the first fitting land of a smaller value of rigidity is engaged, while remaining portions of the first fitting land are at least partially disengaged;

(c) executing a fitting operation on a second fitting land to obtain a provisional fitting condition where only a portion of the second fitting land of a smaller value of rigidity is engaged, while remaining portions are at least partially disengaged, while the provisional fitting condition at the first land is maintained; and (d) executing a complete fitting operation of said first and second fitting lands by a self-guided fitting operation until said respective remaining portions thereof are fully engaged.

9. A method for fitting two work-pieces separated with each other and having at least two pairs of fitting lands, comprising the steps of:

(a) providing holding means for stationary holding one of the work-pieces;

(b) providing fitting means for movably holding the other work-piece, said fitting means being capable of moving the other work-piece toward said one work-piece;

(c) determining a consecutive order of fitting operations between the at least two pairs of fitting lands;

(d) determining if an initially selected pair of fitting lands to be subjected to a first stage fitting operation has a fitting portion which is within a first range of assembling allowance;

(e) upon a determination that the initially selected pair of fitting lands is out of the first range of assembling allowance at the step (d), correcting a relative deviation in the initially selected pair of fitting lands by moving the other work-piece with said fitting means so that the initially selected pair of fitting lands is within the first range of assembling allowance;

(f) with regard to the initially selected fitting lands within the first range of assembling allowance, executing a fitting operation by moving the other work-piece with said fitting means so that the initially selected pair of fitting lands are in a provisionally fitted condition;

(g) with regard to fitting lands to be fitted in a secondary stage fitting operation, determining if a secondary selected pair of fitting lands subjected to the secondary stage fitting operation has a fitting portion which is within a second range of assembling allowance;

(h) upon a determination that the secondary selected pair of fitting lands in the secondary stage fitting operation is out of the second range of assembling allowance at the step (g), correcting a relative deviation in the secondary selected lands by moving the other work-piece with said fitting means so that the secondary selected pair of fitting lands is within the second range of assembling allowance, while maintaining the provisional fitting condition of the initially selected fitting lands;

(i) with regard to the secondary selected fitting lands within the second range of assembling allowance, executing a fitting operation by moving the other work-piece with said fitting means so that the secondary selected pair of fitting lands are in a provisionally fitted condition with each other; and (j) for any remaining lands, repeating the above mentioned steps (g) to (i), so that provisional fitting operations of said remaining lands are executed while the provisional fitting conditions of the previously fitted lands are maintained.

10. A method for fitting two work-pieces separated with each other and having at least two pairs of fitting lands, comprising the steps of:

(a) comparing the at least two pairs of fitting lands by their least values of rigidity to select a first fitting land providing a lower value of least rigidity than the remaining fitting lands which have a higher value of least rigidity;

(b) determining if an initially selected pair of fitting lands subjected to a first stage fitting operation has a fitting portion which is within a first range of assembling allowance;

(c) upon a determination that the initially selected pair of fitting lands is out of the first range of assembling allowance at the step (b), correcting a relative deviation in the initially selected pair of fitting lands by moving one of said work-pieces so that the initially selected pair of fitting lands is within the first range of assembling allowance;

(d) with regard to the initially selected fitting lands within the first range of assembling allowance, executing a fitting operation by moving said one of said work-pieces in order to obtain a provisional fitting condition, where only a portion of the first land, that has a smaller value of rigidity than other portions of said first land, is engaged;

(e) determining if a secondary selected pair of fitting lands subjected to a secondary stage fitting operation has a fitting portion which is within a second range of assembling allowance;

(f) upon a determination that the secondary selected pair of fitting lands in the secondary stage fitting operation is out of the second range of assembling allowance at the step (e), correcting a relative deviation in the secondary selected pair of fitting lands by moving said one of said work-pieces so that the secondary selected pair of fitting lands is within the second range of assembling allowance, while maintaining the provisional fitting condition of the initially selected fitting lands;

(g) executing a fitting operation of the secondary fitting lands to obtain a provisional fitting condition where only a portion of the second fitting land, that has a smaller value of rigidity than other portions of the second fitting land, is engaged, while the provisional fitting condition of the first land is maintained;

(h) for any remaining fitting lands, repeating the above steps (e) to (g) for obtaining a provisional fitting condition of said remaining fitting lands; and (i) executing a complete fitting operation of all fitting lands under a provisional fitting condition.

11. A method for fitting two work-pieces separated with each other and having at least two pairs of fitting lands, comprising the steps of:

(a) comparing the at Least two pairs of fitting lands by their least values of rigidity to select a first fitting land providing a lower value of least rigidity than the remaining fitting lands which have a higher value of least rigidity;

(b) determining if an initially selected pair of fitting lands subjected to a first stage fitting operation has a fitting portion which is within a first range of assembling allowance;

(c) upon a determination that the initially selected pair of fitting lands is out of the first range of assembling allowance at the step (b), correcting a relative deviation in the initially selected pair of fitting lands by moving one of said work-pieces so that the initially selected pair of fitting lands is within the first range of assembling allowance;

(d) with regard to the initially selected fitting lands within the first range of assembling allowance, executing a fitting of a portion of the land within the assembling allowance, and then executing a self guided fitting operation by moving said one of said work-pieces until the initially selected pair of fitting lands are fully fitted with each other;

(e) with regard to the fitted lands of the first stage fitting operation, determining if it is necessary to obtain a provisional fitting condition for allowing remaining lands to be fitted;

(f) obtaining a provisional fitting condition for the initially selected lands where only a portion of the initially selected lands having a rigidity less than other portions thereof is engaged when an affirmative determination is obtained at the step (e);

(g) determining if a secondary selected pair of fitting lands subjected to a second stage fitting operation has a fitting portion which is within a second range of assembling allowance;

(h) upon a determination that the secondary selected pair of fitting lands in the secondary stage fitting operation is out of the second range of assembling allowance at the step (g), correcting a relative deviation in the secondary selected pair of fitting lands by moving said one of said work-pieces so that the secondary selected pair of fitting lands is within the second range of assembling allowance, while maintaining the provisional fitting condition of the initially selected fitting land;

(i) executing a fitting operation on the secondary selected land so that a provisional fitting condition is obtained;

(j) repeating the steps (g) to (i) for remaining lands; and (k) executing a self-guided fitting operation for the lands under a provisional fitting condition until fully fitted conditions of the lands is obtained.

12. A system for fitting two work-pieces separated from each other and having at least two pairs of fitting lands, comprising:

means for holding at least one of the work-pieces and for obtaining a relative movement of the work-pieces for obtaining a fitting operation of the at least two pairs of fitting lands;

means for determining an order of fitting operations between fitting lands;

means for determining, for an initially selected fitting land, if a fitting portion exists within an assembling allowance;

means for obtaining a relative movement between the work-pieces with the work-piece holding means so that the initially selected fitting land is within the assembling allowance; and means for executing a fitting operation when the initially selected fitting land is within the assembling allowance.

13. A system for fitting two work-pieces separated with each other and having at least two pairs of fitting lands, comprising the steps of:

(a) means for stationary holding one of the work-pieces;

(b) fitting means for movably holding the other work-piece, said fitting means being capable of moving the other work-piece toward said one work-piece;

(c) means for determining a consecutive order of fitting operations between the at least two pairs of fitting lands;

(d) sensor means for detecting a deviation between lands to be fitted;

(e) means for determining if a deviation between an initially selected pair of fitting lands subjected to a first stage fitting operation is within a first range of assembling allowance;

(f) means, upon a determination that the initially selected pair of fitting lands is out of the first range of assembling allowance, for operating the fitting means to obtain a relative movement between the work-pieces for correcting a relative deviation in the initially selected fitting lands so that the initially selected pair of fitting lands is within the first range of assembling allowance;

(g) means, with regard to the initially selected fitting lands within the first range of assembling allowance, for operating the fitting means for executing a fitting operation by moving the other work-piece with said fitting means so that the fitting lands of the initially selected pair are fitted with each other;

(h) means, with regard to secondary selected fitting lands to be fitted in a secondary stage fitting operation, for determining if a deviation between fitting lands subjected to the secondary stage fitting operation is within a second range of assembling allowance;

(i) means, upon a determination that the secondary selected pair of fitting lands in the secondary stage fitting operation is out of the second range of assembling allowance, for operating the fitting means for correcting a relative deviation in the secondary selected lands by moving the other work-piece with said fitting means so that the secondary selected pair of fitting lands is within the second range of assembling allowance, while maintaining the fitting condition of the initially selected fitting lands; and (j) means, with regard to the secondary selected fitting lands within the second range of assembling allowance, for operating the fitting means for executing a fitting operation by moving the other work-piece with said fitting means so that the secondary selected pair of fitting lands are fitted with each other.

14. A system for fitting two work-pieces separated from each other and having at least two pairs of fitting lands, comprising the steps of:

(a) means for detecting a rigidity of the at least two pairs of fitting lands;

(b) fitting means for obtaining a relative movement of the work-pieces:

(c) means for comparing the fitting lands by their least values of rigidity to select a first fitting land providing a lower value of least rigidity than the remaining fitting lands which have a higher value of least rigidity;

(d) means for operating the fitting means for executing a fitting operation of the first fitting land to obtain a provisional fitting condition where only a portion of the first fitting land of a smaller value of rigidity is engaged, while remaining portions are at least partially disengaged;

(e) means for operating the fitting means for executing a fitting operation of a second fitting land to obtain a provisional fitting condition where only a portion of the second fitting land of a smaller value of rigidity is engaged, while the remaining portions are at least partially disengaged, while the provisional fitting condition of the first fitting land is maintained; and (f) means for operating the fitting means for executing a complete fitting operation of all of the fitting lands by a self-guided fitting operation until the remaining portions of the lands are fully engaged.

15. A method as in claim 9, wherein said step of determining a consecutive order comprises comparing fitting lands by their values of rigidity to select a first fitting land having a lower value of least rigidity than the remaining fitting lands which have a higher value of least rigidity.

* * * * *